US011845864B2

(12) United States Patent
Karagiannis et al.

(10) Patent No.: US 11,845,864 B2
(45) Date of Patent: *Dec. 19, 2023

(54) INTERLAYERS COMPRISING POLYESTERAMIDE COMPOSITIONS

(71) Applicant: Solutia Inc., St. Louis, MO (US)

(72) Inventors: Aristotelis Karagiannis, Amherst, MA (US); Paul Hastings, Milford, MA (US); Pu Zhang, Suffield, CT (US); Pinguan Zheng, Johnson City, TN (US); Emmett Dudley Crawford, Kingsport, TN (US); Scott Ellery George, Kingsport, TN (US); Aireal Denise Pressley, Limestone, TN (US); Khanh Duc Tran, South Hadley, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,154

(22) Filed: Dec. 28, 2021

(65) Prior Publication Data

US 2022/0119639 A1     Apr. 21, 2022

Related U.S. Application Data

(63) Continuation of application No. 15/733,380, filed as application No. PCT/US2019/014749 on Jan. 23, 2019, now Pat. No. 11,242,456.

(60) Provisional application No. 62/620,563, filed on Jan. 23, 2018.

(30) Foreign Application Priority Data

Jan. 17, 2019    (WO) ................ PCT/US2019/013953
Jan. 17, 2019    (WO) ................ PCT/US2019/013958

(51) Int. Cl.
| | |
|---|---|
| C08L 77/12 | (2006.01) |
| C08G 69/44 | (2006.01) |
| C08J 5/18 | (2006.01) |
| C08K 5/053 | (2006.01) |
| C08K 5/092 | (2006.01) |
| C08K 5/17 | (2006.01) |
| C08G 73/10 | (2006.01) |
| C08G 73/16 | (2006.01) |
| C08K 5/5435 | (2006.01) |
| C08K 5/5465 | (2006.01) |
| B32B 27/08 | (2006.01) |
| B32B 27/36 | (2006.01) |
| C08K 3/34 | (2006.01) |
| B32B 17/10 | (2006.01) |

(52) U.S. Cl.
CPC ........ *C08L 77/12* (2013.01); *B32B 17/10036* (2013.01); *B32B 17/10724* (2013.01); *B32B 17/10779* (2013.01); *B32B 27/08* (2013.01); *B32B 27/36* (2013.01); *C08G 69/44* (2013.01); *C08G 73/1003* (2013.01); *C08G 73/16* (2013.01); *C08J 5/18* (2013.01); *C08K 3/34* (2013.01); *C08K 5/053* (2013.01); *C08K 5/092* (2013.01); *C08K 5/17* (2013.01); *C08K 5/5435* (2013.01); *C08K 5/5465* (2013.01); *B32B 2250/03* (2013.01); *B32B 2250/24* (2013.01); *B32B 2250/40* (2013.01); *B32B 2307/412* (2013.01); *B32B 2313/00* (2013.01); *B32B 2367/00* (2013.01); *B32B 2377/00* (2013.01)

(58) Field of Classification Search
None
See application file for complete search history.

(56) References Cited

U.S. PATENT DOCUMENTS

| | | |
|---|---|---|
| 2,191,367 A | 2/1940 | Carothers |
| 2,281,415 A | 4/1942 | Cottman |
| 2,282,026 A | 5/1942 | Bren et al. |
| 2,282,057 A | 5/1942 | Hopkins et al. |
| 2,475,034 A | 7/1949 | Lasher |
| 2,901,466 A | 8/1959 | Kibler |
| 4,013,624 A | 3/1977 | Hoeschele |
| 4,459,400 A | 7/1984 | Kuhfuss et al. |
| 4,485,233 A | 11/1984 | Veazey |
| 5,644,020 A | 7/1997 | Timmermann et al. |
| 5,654,347 A | 8/1997 | Khemani et al. |
| 5,672,676 A | 9/1997 | Turner |
| 5,696,176 A | 12/1997 | Khemani et al. |
| 6,353,084 B1 | 3/2002 | Warzelhan et al. |
| 8,101,705 B2 | 1/2012 | Crawford et al. |
| 9,150,763 B2 | 10/2015 | Lopez et al. |

(Continued)

FOREIGN PATENT DOCUMENTS

| | | |
|---|---|---|
| CA | 816767 A | 7/1969 |
| CA | 2 317 747 A1 | 5/2011 |

(Continued)

OTHER PUBLICATIONS

Notification of Transmittal of the International Search Report and the Written Opinion of the International Searching Authority dated Nov. 26, 2019 for International Application No. PCT/US2019/013953.

(Continued)

*Primary Examiner* — Prashant J Khatri
(74) *Attorney, Agent, or Firm* — Michael K. Carrier

(57) ABSTRACT

The present application discloses interlayers comprising novel polyesteramides comprising diols with tunable properties based on the monomers and monomer ratios used to prepare the polyesteramides and varying the reaction conditions. The interlayers have improved properties and can be used in many different applications.

20 Claims, No Drawings

(56) References Cited

U.S. PATENT DOCUMENTS

| | | |
|---|---|---|
| 9,371,421 B2 | 6/2016 | Kwon et al. |
| 9,580,552 B2 | 2/2017 | Im et al. |
| 11,130,859 B2 | 9/2021 | Miyabe et al. |
| 11,149,124 B2 | 10/2021 | Minkwitz et al. |
| 2010/0203275 A1 | 8/2010 | Hoffmann |
| 2013/0288058 A1 | 10/2013 | Hong et al. |
| 2014/0187739 A1 | 7/2014 | Kwon et al. |
| 2016/0129673 A1 | 5/2016 | Oowashi et al. |
| 2017/0043606 A1 | 2/2017 | Meltzer et al. |
| 2019/0194392 A1 | 6/2019 | Minkwitz |
| 2019/0224902 A1 | 7/2019 | Goetz et al. |

FOREIGN PATENT DOCUMENTS

| | | |
|---|---|---|
| CN | 101585915 B | 11/2009 |
| CN | 102234373 A | 11/2011 |
| CN | 102079814 B | 5/2012 |
| CN | 102643422 A | 8/2012 |
| CN | 103881086 A | 6/2014 |
| CN | 106967214 B | 7/2019 |
| DE | 12 34 354 B | 2/1967 |
| EP | 0 641 817 A2 | 3/1995 |
| EP | 0 879 265 B1 | 5/2000 |
| EP | 1 036 107 A1 | 9/2000 |
| EP | 1928969 B1 | 4/2010 |
| EP | 1 397 415 B1 | 9/2010 |
| EP | 2277937 B1 | 7/2012 |
| EP | 2202260 B1 | 12/2012 |
| GB | 1146539 | 3/1969 |
| JP | 2003176350 A | 6/2003 |
| JP | 2003176351 A | 6/2003 |
| JP | 2003200545 A | 7/2003 |
| WO | WO 2008/112833 A1 | 9/2008 |
| WO | WO 2019 147457 A3 | 8/2019 |
| WO | WO 2019 147458 A1 | 8/2019 |
| WO | WO 2019 147671 A1 | 8/2019 |
| WO | WO 2019 147676 A1 | 8/2019 |

OTHER PUBLICATIONS

Notification of Transmittal of the International Search Report and the Written Opinion of the International Searching Authority dated Apr. 24, 2019 for International Application No. PCT/US2019/013958.

Notification of Transmittal of the International Search Report and the Written Opinion of the International Searching Authority dated Apr. 24, 2019 for International Application No. PCT/US2019/014749.

Notification of Transmittal of the International Search Report and the Written Opinion of the International Searching Authority dated Apr. 24, 2019 for International Application No. PCT/US2019/014754.

Bayer Material Science, Makrolon 2405, technical datasheet Edition Mar. 19, 2008: http://www.lidorr.com/_Uploads/dbsAttachedFiles/Makrolon2407DS.pdf.

Carothers, Wallace H., et al.; "Studies of Polymerization and Ring Formation. XIII. Polyamides and Mixed Polyester-Polyamides"; Journal of American Chemical Society, 1932, 54, pp. 1566-1569.

Grigat, E., et al.; "BAK 1095 and BAK2195: completely biodegradable synthetic thermoplastics"; Polymer Degradation and Stability 59 (1998), pp. 223-226.

Polymer Resources Litd. PC/ABS-GP2, technical datasheet: http://catalog.ides.com/Datasheet.aspx?I=73811&U=1&CULTURE=en-US&e=32866.

Timmermann, Ralf; "Polyesteramides"; Biopolymers, 4, (2002), pp. 315-327.

Wade, Bruce; "Vinyl Acetal Polymers"; Encyclopedia of Polymer Science and Technology, 2016, pp. 1-22.

Co-pending U.S. Appl. No. 16/960,654, filed Jul. 8, 2020; Crawford et al.; now U. S. Publication No. 2020-0362114.

Co-pending U.S. Appl. No. 16/960,663, filed Jul. 8, 2020; Cannon et al.; now U. S. Publication No. 2020-0354571.

Co-pending application U.S. Appl. No. 15/733,378, filed Jul. 16, 2020; Karagiannis et al.; now U. S. Publication No. 2021-0094264.

Dow Corning, "A Guide to Silane Solutions from Dow Corning"; 2005; pp. 1-32.

Office Action dated Jul. 12, 2022 received in U.S. Appl. No. 16/960,663.

Office Action dated Nov. 3, 2022 received in U.S. Appl. No. 16/960,663.

Non-Final Rejection received in U.S. Appl. No. 15/733,378 dated Feb. 28, 2022.

Final Rejection received in U.S. Appl. No. 15/733,378 dated Sep. 26, 2022.

INTERLAYERS COMPRISING POLYESTERAMIDE COMPOSITIONS

CROSS-REFERENCE TO RELATED APPLICATION(S)

This application is a continuation of U.S. application Ser. No. 15/733,380, filed on Jul. 16, 2020, which is a national stage filing under 35 USC § 371 of International Application Number PCT/US2019/014749, filed on Jan. 23, 2019 which claims the benefit of the filing date to U.S. Provisional Application No. 62/620,563, filed on Jan. 23, 2018; International Application Number PCT/US2019/014749 also claims priority to International Application Number PCT/US2019/013958, and International Application Number PCT/US2019/013953, both filed Jan. 17, 2019; the entire disclosures of which are incorporated by reference herein.

BACKGROUND OF THE INVENTION

Thermoplastic polymers are useful in a wide variety of applications, including, for example, various electrical, automotive, medical, consumer, industrial, and packaging applications. Thermoplastic polymers are advantaged over thermoset plastics in that thermoplastic polymers can be easily melt processed into a variety of useful articles.

Different types of thermoplastic polymers have different properties that make them desirable for certain end uses. Elastomeric thermoplastic polymers generally have glass transition temperature values below room temperature and low modulus values making them suitable for applications requiring flexibility and stretchability. In contrast, rigid thermoplastic polymers generally have glass transition temperature values above room temperature and high modulus values making them suitable for applications requiring stiffness and strength.

Polyesteramides are one class of thermoplastic polymers which are formed from the polycondensation of diacids, diols, and diamines (e.g., WO2008112833, U.S. Pat. Nos. 5,672,676, 2,281,415, CA2317747). Polyesteramides have attracted strong industrial interest primarily because of their excellent heat resistance properties (U.S. Pat. No. 5,672,676), their amenability to processing and their potential for biodegradability (e.g., WO2008112833).

The present application discloses novel polyesteramides comprising diols such as TMCD and/or CHDM having tunable properties by adjusting the monomer ratios and varying the reaction conditions. The polyesteramides are useful in a variety of engineering plastics applications wherein chemical resistance, UV resistance, moisture barrier, surface energy, heat resistance, mechanical, optical, and/or melt processability properties are important. One such application includes polymer sheets, layers, interlayers or films.

Polymer sheets can be used as interlayers in multiple layer panels formed by sandwiching the interlayer between two panes of glass. Such laminated multiple layer panels are commonly referred to as "safety glass" and have use in both architectural and automotive applications. One of the primary functions of the interlayer in a safety glass panel is to absorb energy resulting from impact to the panel without allowing penetration of an object through the glass. The interlayer also helps keep the glass bonded when the applied force is sufficient to break the glass in order to prevent the glass from forming sharp pieces and scattering. Additionally, the interlayer can also provide the laminated panel with a higher sound insulation rating, reduce ultraviolet (UV) and/or infrared (IR) light transmission through the panel, and enhance its aesthetic appeal through the addition of color, textures, etc.

Often, when an interlayer exhibits a desirable property, such as rigidity, it may lack other desirable or important properties, such as impact resistance or optical clarity. In some applications safety glass panels may be used as a structural element, but it may also be required to impart aesthetic characteristics to the application. In such cases, an optimal optical performance, rigidity, and impact resistance is not only desirable, but required. Unfortunately, as the rigidity of conventional interlayers is increased, the impact resistance of the resulting panel worsens. Similarly, conventional interlayers formulated for enhanced impact strength often lack necessary rigidity that is required in many applications, such as applications requiring excellent structural support properties.

An emerging market in architectural laminated glass requires interlayers with structural properties such as load bearing ability. Such an interlayer is Eastman's Saflex™ DG structural interlayer, which is made of plasticized polyvinyl butyral ("PVB"). Generally, structural interlayers are stiffer products than standard PVB interlayers and this higher stiffness allows laminates made with structural interlayer to sustain higher loads. Alternatively, structural interlayers can be used to allow a reduction in the glass thickness while achieving the same laminate loading.

Higher performance structural interlayers are desirable as more applications requiring stiffer interlayers are emerging (e.g., single side balcony laminates, canopies, staircases, and support beams). However, some of the commercially-available interlayers exhibit deficiencies in terms of processability and/or functionality. Further, the attraction of glass in many of these structural applications is the clarity of the glass panel. Thus, the layers or interlayers must also not hinder the optical properties of the structural glass articles in which they are incorporated.

Additionally, lighter weight and/or lower cost laminates are desirable for many applications. These lighter weight laminates must still possess the desired physical and optical properties, such as having required impact protection, clarity and other properties. One way to achieve a lighter weight laminate is to reduce the thickness of glass. However, if the thickness of glass is reduced too much, the rigidity of the laminate may be compromised. Higher rigidity interlayers can then be used to restore part of the lost rigidity and result in a lighter weight acceptable laminate. Another way to reduce laminate weight is to eliminate one or more panes of glass and replace them by rigid, transparent plastic pane of sufficiently high rigidity to maintain the integrity of the laminate as well as desirable optical properties.

Thus, a need exists for polymeric interlayers that exhibit strength and rigidity, while still providing sufficient impact resistance. Ideally, such interlayers would also exhibit desirable optical properties, such as low haze and no yellowing. Desirably, these interlayers could be used in multiple layer panels for a wide range of applications, including architectural applications, and would provide an optimized balance of structural, performance, and aesthetic properties.

SUMMARY OF THE INVENTION

One embodiment of the present application concerns an interlayer comprising a layer comprising a polyesteramide composition, the polyesteramide composition comprising: (a) a diamine component comprising: 0.1 to 99 mole % of diamine residues derived from cycloaliphatic diamines, aliphatic diamines, or a combination thereof; (b) a diol component comprising: 0.1 to 99 mole % of diol residues derived from at least one diol which is a cycloaliphatic diol, a mixture of cycloaliphatic diols, or a mixture at least one cycloaliphatic diol with at least one aliphatic diol; and (c) a diacid component comprising: 0.1 to 100 mole % of diacid residues derived from a diacid chosen from $HO_2C-(C_{2-40})$alkylene-$CO_2H$, or $HO_2C-(C_{3-10})$cycloalkyl-$CO_2H$; wherein each cycloalkyl is unsubstituted or substituted by $(C_{1-3})$alkyl, wherein the total mole % of the diacid component is 100 mole %, and wherein the total mole % of the combined diol and diamine component is 100 mole %.

Another embodiment of the present application concerns a multiple layer interlayer comprising a first layer comprising a polyesteramide composition, the polyesteramide composition comprising: (a) a diamine component comprising: 0.1 to 99 mole % of diamine residues derived from cycloaliphatic diamines, aliphatic diamines, or a combination thereof; (b) a diol component comprising: 0.1 to 99 mole % of diol residues derived from at least one diol which is a cycloaliphatic diol, a mixture of cycloaliphatic diols, or a mixture of at least one cycloaliphatic diol with at least one aliphatic diol; and (c) a diacid component comprising: 0.1 to 100 mole % of diacid residues derived from a diacid chosen from $HO_2C-(C_{2-40})$alkylene-$CO_2H$, or $HO_2C-(C_{3-10})$cycloalkyl-$CO_2H$; wherein each cycloalkyl is unsubstituted or substituted by $(C_{1-3})$alkyl, wherein the total mole % of the diacid component is 100 mole %, and wherein the total mole % of the combined diol and diamine component is 100 mole %, and a second layer comprising a polymer composition different from the polyesteramide composition of the first layer.

The present application also discloses multilayer panels comprising the interlayers.

DETAILED DESCRIPTION OF THE INVENTION

In this specification and in the claims that follow, reference will be made to a number of terms, which shall be defined to have the following meanings.

The singular forms "a," "an," and "the" include plural referents unless the context clearly dictates otherwise.

"Diol" means a chemical with two alcohol functional groups. Examples include 1,4-butanediol, propylene glycol, 2,2,4,4-tetramethyl-1,3-cyclobutanediol, 1,4-cyclohexanedimethanol, propylene-1,3-diol, and the like.

"Diamine" means a chemical with two amino functional groups. Examples include 1,6-diaminohexane, ethylenediamine, 4,4'-methylenebis(2-methylcyclohexylamine), 5-amino-1,3,3-trimethylcyclohexanemethylamine, 4,4'-methylenebis(cyclohexylamine), 1,4-bis(aminomethyl)cyclohexane and the like.

"Alkanol" means an alkane or alkyl group comprising an alcohol group. Examples include methanol, ethanol, propanol, butyl alcohol, and the like.

"Diacid" means a chemical with two carboxylic acid groups. Examples include 1,12-dodecanedioic acid, adipic acid, cyclohexanedicarboxylic acid and the like.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein the term "chosen from" when used with "and" or "or" have the following meanings: For example, a variable chosen from A, B and C means that the variable can be A alone, B alone, or C alone. For example, a variable A, B, or C means that the variable can be A alone, B alone, C alone, A and B in combination, B and C, A and C in combination, or A, B, and C in combination.

As used herein, the term "residue(s)" refers to the monomer unit or repeating unit in a polymer, oligomer or dimer. For example, a polymer can be made from the condensation of the following monomers: terephthalic acid ("TPA") and cyclohexyl-1,4-dimethanol ("CHDM"). The condensation results in the loss of water molecules. The residues in the resulting polymer are derived from either terephthalic acid and cyclohexyl-1,4-dimethanol.

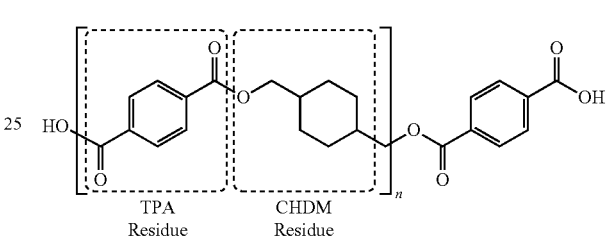

TPA Residue     CHDM Residue

The polymer can also be functionalized by other reactants (e.g., epoxides, isocyanates, and the like) during and after the polymerization reaction. The incorporated reactants are also considered residues.

The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

As used herein, the term "alkyl" shall denote a hydrocarbon substituent. Alkyl groups suitable for use herein can be straight, branched, or cyclic, and can be saturated or unsaturated. The carbon units in the alkyl group is often included; for example $(C_{1-6})$alkyl. Alkyl groups suitable for use herein include any $(C_{1-20})$, $(C_{1-12})$, $(C_{1-5})$, or $(C_{1-3})$ alkyl groups. In various embodiments, the alkyl can be a $C_{1-5}$ straight chain alkyl group. In still other embodiments, the alkyl can be a $C_{1-3}$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. As used herein, the term "alkylene" shall mean a bivalent alkyl radical.

"Cycloalkyl" means a cyclic alkyl group having at least three carbon units. The carbon units in the cycloalkyl group is often included; for example $(C_{3-8})$cycloalkyl. Nonlimiting examples of cycloalkyl include cyclopropyl, cyclobutyl, cyclohexyl, cycloheptyl, and the like.

"Bicycloalkyl" means a ring system with two fused cycloalkyl rings. The bicycloalkyl ring system may be bridged or unbridged. The number of carbon units may be specified (e.g., $C_{6-10}$).

"Heterocyclyl" means a nonaromatic ring system containing one or more heteroatoms including N, O, and S. The number and kind of heteroatoms present may be specified. The size of the ring may also be specified. An example includes a 6- to 8-membered heterocyclyl containing 2 N heteroatoms. Examples of a heterocyclyl groups include piperidinyl, piperazinyl, and pyrrolidine.

"Amorphous" means that the material will not exhibit a melting point by dynamic scanning calorimetry ("DSC") after a scanning sequence consisting of cooling from the melt state (i.e. generally in the area of 280-300° C.) and heating under typical ramp (both cooling and heating) rates of 20° C./minute under a nitrogen atmosphere with the temperature range covered by the scans is from −50° C. to 300° C.

"Semi-crystalline" means that the material exhibits a melting point as detectable by DSC after a scanning sequence consisting of cooling from the melt state (i.e. generally in the area of 280-300° C.) and heating under typical ramp (both cooling and heating) rates of 20° C./minute under a nitrogen atmosphere with the temperature range covered by the scans is from −50° C. to 300° C.

Alkane dioic acids; such as heptanedioic acid, octanedioic acid, nonanedioic acid, decanedioic acid, undecanedioic acid, dodecanedioic acid, tridecanedioic acid, hexadecanedioic acid, octadecanedioic acid, or eicosanedioic acid; can be have terminal carboxylic acids or internal carboxylic acids. For example, heptane dioic acid can be 1,7 heptane dioic acid, 1,6-heptane dioic acid, 1,5-heptane dioic acid, 1,4-heptane dioic acid, 2,6-heptane dioic acid, 3,5-heptane dioic acid, and the like. The alkane group can be unbranched or branched. For example, heptane dioic acid can be 2-methylhexanedioic acid, 3-methylhexanedioic acid, 2-ethylpendanedioic acid, and the like.

"Epoxy silane" means a chemical that has at least one silane moiety and an epoxy moiety connected by a linker. Nonlimiting examples of epoxy silanes are as follows:

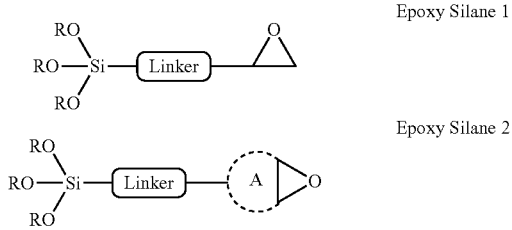

Epoxy Silane 1

Epoxy Silane 2

R is ($C_{1-12}$)alkyl;
A group is a ($C_{3-8}$)cycloalkyl ring system;
Linker is a bond, an ($C_{1-20}$)alkyl, ($C_{3-8}$)cycloalkyl, hetero($C_{2-20}$)alkyl, or aryl.

The epoxy group of the epoxy silane can react with the polyesteramides to incorporate the epoxy silane in the polymer. The epoxy silane can be incorporated in the reaction to synthesize the polymer, the epoxy silane can be incorporated as an additive after the polymer is synthesized, or the epoxy silane can be incorporated on the surface of articles formed from the polymer. By incorporating the epoxy silane into the polymer, the properties of the polymer can be modified. For example, the epoxy silane can be used to improve the adhesion of the polymer to various surfaces (e.g., glass surfaces). Specific examples of epoxy silanes include trimethoxy[2-7-oxabicyclo[4.1.0]hept-3-yl]ethyl]silane, triethoxy[2-7-oxabicyclo[4.1.0]hept-3-yl]ethyl]silane, (3-glycidyloxypropyl)trimethoxysilane, (3-glycidyloxypropyl)trimethoxysilane, diethoxy(3-glycidyloxypropyl)methylsilane, 3-glycidoxypropyldimethylethoxysilane, 5,6-epoxyhexyltriethoxysilane, and the like.

"Isocyanate silane" means a chemical that has at least one silane moiety and an isocyanate moiety connected by a linker. Nonlimiting examples of isocyanate silanes are as follows:

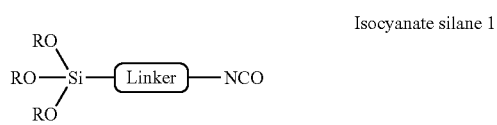

Isocyanate silane 1

R is ($C_{1-12}$)alkyl;
Linker is a bond, an ($C_{1-20}$)alkyl, ($C_{3-8}$)cycloalkyl, hetero($C_{2-20}$)alkyl, or aryl.

The isocyanate group of the isocyanate silane can react with the polyesteramides to incorporate the isocyanate silane in the polymer. The isocyanate silane can be incorporated in the reaction to synthesize the polymer, the isocyanate silane can be incorporated as an additive after the polymer is synthesized, or the isocyanate silane can be incorporated on the surface of articles formed from the polymer. By incorporating the isocyanate silane into the polymer, the properties of the polymer can be modified. For example, the isocyanate silane can be used to improve the adhesion of the polymer to various surfaces (e.g., glass surfaces). Nonlimiting examples of isocyanate silanes include 3-isocyanotopropyltrimethoxysilane, 3-isocyanotopropyltriethoxysilane and the like.

Compositions of Matter

The present application discloses a polyesteramide comprising: (a) a diamine component comprising: 0.1 to 99 mole % of diamine residues derived from cycloaliphatic diamines, aliphatic diamines, or a combination thereof; (b) a diol component comprising: 0.1 to 99 mole % of diol residues derived from at least one diol which is a cycloaliphatic diol, a mixture of cycloaliphatic diols, or a mixture a cycloaliphatic diol with am aliphatic diol; and (c) a diacid component comprising: 0.1 to 100 mole % of diacid residues derived from a diacid chosen from $HO_2C—(C_{2-40})$alkylene-$CO_2H$, or $HO_2C—(C_{3-10})$cycloalkyl-$CO_2H$; wherein each cycloalkyl is unsubstituted or substituted by ($C_{1-3}$)alkyl, wherein the total mole % of the diacid component is 100 mole %, and wherein the total mole % of the combined diol and diamine component is 100 mole %.

In one embodiment, the polyesteramide comprises: (a) a diamine component comprising: 1 to 99 mole % of diamine residues derived from diamine which is a $CH_2((C_{3-8})$cycloalkyl-$NH_2)_2$; (b) a diol component comprising: 1 to 99 mole % of diol residues derived from a diol which is a ($C_{3-8}$)cycloalkyl di(($C_{1-3}$)alkanol); (c) a diacid component comprising: 10 to 100 mole % of diacid residues derived from a diacid which is chosen from $HO_2C—(C_{2-40})$alkylene-$CO_2H$, or $HO_2C—(C_{3-10})$cycloalkyl-$CO_2H$; wherein each cycloalkyl is unsubstituted or substituted by 1-4 ($C_{1-3}$)alkyl, wherein the total mole % of the diacid component is 100 mole %, and wherein the total mole % of the combined diol and diamine component is 100 mole %.

In one embodiment, the polyesteramide comprises: (a) a diamine component comprising: 1 to 99 mole % of diamine residues derived from diamine which is a $CH_2((C_{3-8})$cycloalkyl-$NH_2)_2$; (b) a diol component comprising: 1 to 99 mole % of diol residues derived from a diol which is a $(C_{3-8})$cycloalkyl di$((C_{1-3})$alkanol); (c) a diacid component comprising: 10 to 100 mole % of diacid residues derived from a diacid which is chosen from $HO_2C-(C_{2-20})$alkylene-$CO_2H$, or $HO_2C-(C_{3-10})$cycloalkyl-$CO_2H$; wherein each cycloalkyl is unsubstituted or substituted by 1-4 $(C_{1-3})$alkyl, wherein the total mole % of the diacid component is 100 mole %, and wherein the total mole % of the combined diol and diamine component is 100 mole %.

In one embodiment, the diol is chosen from cyclohexane-1,4-dimethanol, cyclohexane-1,3-dimethanol, cyclopentane-1,3-dimethanol, cyclobutane-1,3-dimethanol, cycloheptane-1,4-dimethanol, or cyclohexane-1,4-diethanol. In one class of this embodiment, the diol residues are present at from about 15 mole % to about 75 mole %.

In one class of this embodiment, the diol is chosen from cyclohexane-1,4-dimethanol or cyclohexane-1,3-dimethanol. In one class of this embodiment, the diol is cyclohexane-1,4-dimethanol. In one class of this embodiment, the diol is cyclohexane-1,3-dimethanol. In one class of this embodiment, the diol is cyclobutane-1,3-dimethanol. In one class of this embodiment, the diol is cycloheptane-1,4-dimethanol. In one class of this embodiment, the diol is cyclohexane-1,4-diethanol. In one subclass of any of these classes, the diol residues are present at from about 15 mole % to about 75 mole %.

In one embodiment, the diol residues are present at from about 5 mole % to about 90 mole %. In other embodiments, the diol residues are present at from about 10 mole % to about 90 mole %, from about 10 mole % to about 80 mole %. from about 15 mole % to about 30 mole, from about 30 mole % to about 50 mole %, or from about 50 mole % to about 70 mole %.

In one embodiment, the diol component further comprises an alkylene glycol residue derived from H—[—O—$CH_2$—$CH_2$—$(CH_2)_n$—]$_m$—OH, wherein n is an integer from 0 to 2; and m is an integer from 2 to 50. In one class of this embodiment, the alkylene glycol residues are present from 0.01 to 10 mole %, from 0.01 to 5 mole %, from 0.01 to 1 mole %, from 0.01 to 0.5 mole %, from 0.01 to 0.1 mole %.

In one embodiment, the diamine is chosen from 4,4'-methylenebis(2-methylcyclohexylamine), 4,4'-methylenebis(cyclohexylamine), 4,4'-methylenebis(3-methylcyclohexan-1-amine), 4-((4-aminocyclohexyl)methyl)-2-methylcyclohexan-1-amine, 4,4'-methylenebis(2,6-dimethylcyclohexan-1-amine), 3(4),8(9)-bis(aminomethyl)tricyclo[5.2.1.0$^{2,6}$]decane, N-Methyl diethanolamine, or 1,3-bis(aminomethyl)cyclohexane, or a mixture of 2,4,4-trimethyl hexanediamine and 2,2,4-trimethyl hexanediamine. In one class of this embodiment, the diamine residues are present at from about 10 mole % to about 90 mole %.

In one class of this embodiment, the diamine is chosen from 4,4'-methylenebis(2-methylcyclohexylamine) or 4,4'-methylenebis(cyclohexylamine). In one class of this embodiment, the diamine is 4,4'-methylenebis(2-methylcyclohexylamine). In one class of this embodiment, the diamine is 4,4'-methylenebis(cyclohexylamine). In one class of this embodiment, the diamine is 4,4'-methylenebis(3-methylcyclohexan-1-amine). In one class of this embodiment, the diamine is 4,4'-methylenebis(2-methylcyclohexan-1-amine). In one class of this embodiment, the diamine is 4-((4-aminocyclohexyl)methyl)-2-methylcyclohexan-1-amine. In one class of this embodiment, the diamine is 4,4'-methylenebis(2,6-dimethylcyclohexan-1-amine). In one class of this embodiment, the diamine is 3(4),8(9)-bis(aminomethyl)tricyclo[5.2.1.0$^{2,6}$]decane. In one class of this embodiment, the diamine is N-Methyl diethanolamine. In one class of this embodiment, the diamine is a mixture of 2,4,4-trimethyl hexanediamine and 2,2,4-trimethyl hexanediamine. In one class of this embodiment, the diamine is 1,3-bis(aminomethyl)cyclohexane. In one subclass of any of these classes, the diamine residues are present at from about 10 mole % to about 85 mole %.

In one embodiment, the diamine residues are present at from about 5 mole % to about 90 mole %. In other embodiments, the diamine residues are present at from about 10 mole % to about 85 mole %, from about 10 mole % to about 80 mole %, from about 15 mole % to about 30 mole %, from about 30 mole % to about 50 mole %, or from about 50 mole % to about 70 mole %.

In one embodiment, the $HO_2C-(C_{2-40})$alkylene-$CO_2H$ is present from about 40 mole % to about 70 mole % and the $HO_2C-(C_{3-10})$cycloalkyl-$CO_2H$ is present from about 30 mole % to about 60 mole %. In one embodiment, the $HO_2C-(C_{2-40})$alkylene-$CO_2H$ is present from about 50 mole % to about 60 mole % and the $HO_2C-(C_{3-10})$cycloalkyl-$CO_2H$ is present from about 40 mole % to about 50 mole %. In one embodiment, the $HO_2C-(C_{2-20})$alkylene-$CO_2H$ is present from about 40 mole % to about 70 mole % and the $HO_2C-(C_{3-10})$cycloalkyl-$CO_2H$ is present from about 30 mole % to about 60 mole %. In one embodiment, the $HO_2C-(C_{2-20})$alkylene-$CO_2H$ is present from about 50 mole % to about 60 mole % and the $HO_2C-(C_{3-10})$cycloalkyl-$CO_2H$ is present from about 40 mole % to about 50 mole %.

In one embodiment, the diacid is $HO_2C-(C_{2-20})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol. In one embodiment, the diacid is $HO_2C-(C_{2-40})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol. In one embodiment, the diacid is $HO_2C-(C_{3-10})$cycloalkyl-$CO_2H$. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from succinic acid, glutaric acid, adipic acid, heptanedioic acid, octanedioic acid, nonanedioic acid (e.g., azelaic acid), decanedioic acid (e.g., sebacic acid), undecanedioic acid, dodecanedioic acid, tridecanedioic acid, hexadecanedioic acid, octadecanedioic acid, eicosanedioic acid, 9-[(Z)-non-3-enyl]-10-octyl-nonadecanedioic acid (dimer acid), 9-nonyl-10-octylnonadecanedioic acid (hydrogenated dimer acid, Pripol 1009), cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from adipic acid, 1,12-dodecanedioic acid, azelaic acid, sebacic acid, 1,18-octadecanedioic acid, 9-nonyl-10-octylnonadecanedioic acid (hydrogenated dimer acid, Pripol 1009), cyclohexane-1,3-dicarboxylic acid or cyclohexane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol. In one sub-subclass of this subclass, the adipic acid or 1,12-dodecanedioic acid is present from about 40 mole % to about 70 mole % and the cyclohexane-1,3-dicarboxylic acid is present from about 30 mole % to about 60 mole %. In one sub-subclass of this subclass, the adipic acid or 1,12-dodecanedioic acid is present from about 50 mole % to about 60 mole % and the cyclohexane-1,3-dicarboxylic acid is present from about 40 mole % to about 50 mole %.

In one embodiment, the diacid is chosen from succinic acid, glutaric acid, adipic acid, heptanedioic acid, octanedioic acid, nonanedioic acid (e.g., azelaic acid), decanedioic acid (e.g., sebacic acid), undecanedioic acid, dodecanedioic acid, tridecanedioic acid, hexadecanedioic acid, octadecanedioic acid, or eicosanedioic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from adipic acid, or 1,12-dodecanedioic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is chosen from cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is cyclohexane-1,3-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the diacid is 9-nonyl-10-octylnonadecanedioic acid (hydrogenated dimer acid, Pripol 1009). In one class of this embodiment, the diamine is chosen from 4,4'-methylenebis(2-methylcyclohexylamine) or 4,4'-methylenebis(cyclohexylamine). In one subclass of this class, the diol is cyclohexane-1,4-dimethanol.

In one embodiment, the polyesteramide further comprises branching agent residues derived from a compound chosen from trimellitic acid, trimethylolpropane, trimethylolethane, glycerol, pentaerythritol, citric acid, tartaric acid, 3-hydroxyglutaric acid, glycerin erythritol, threitol, dipentaerythritol, sorbitol, trimellitic anhydride, pyromellitic dianhydride, trimesic acid, or dimethylol propionic acid.

In one class of this embodiment, the branching agent residues are present from about 0.01 to about 10 weight % based on the total weight % of the polyesteramide. In one class of this embodiment, the branching agent residues are present from about 0.001 to about 10 weight % based on the total weight % of the polyesteramide. In other classes of this embodiment, the branching agent residues are present from about 0.01 to about 10 weight %, from about 0.001 to about 5 weight %, from about 0.001 to about 1 weight %, from about 0.001 to about 0.05 weight %, or from about 0.001 to about 0.01 weight % based on the total weight of the polyesteramide.

The branching monomer may be added to the polyesteramide reaction mixture or blended with the polyesteramide in the form of a concentrate as described, for example, in U.S. Pat. Nos. 5,654,347 and 5,696,176, whose disclosure regarding branching monomers for polyesters is incorporated herein by reference.

In one embodiment, the polyesteramide has a glass transition temperature of from about −30° C. to about 200° C. as determined by differential scanning calorimetry (DSC). In other embodiments, the polyesteramide has a glass transition temperature of from about −30° C. to about 20° C., from about −20° C. to about 20° C., from about −20° C. to about 0° C., from about 0° C. to about 200° C., from about 0° C. to about 20° C., from about 20° C. to about 90° C., from about 40° C. to about 90° C., from about 90° C. to about 130° C., from about 130° C. to about 200° C., or from about 90° C. to about 190° C. as determined by differential scanning calorimetry (DSC).

In one embodiment, the polyesteramide has an inherent viscosity of from about 0.3 dL/g to about 2.0 dL/g or more. In other embodiments, the polyesteramide has an inherent viscosity of from about 0.3 dL/g to about 1.4 dL/g, from about 0.4 dL/g to about 0.8 dL/g, from about 0.4 dL/g to about 0.5 dL/g, from about 0.5 dL/g to about 0.6 dL/g, from about 0.6 dL/g to about 0.7 dL/g, from about 0.7 dL/g to about 0.8 dL/g, from about 0.8 dL/g to about 1.4 dL/g, from about 0.9 dL/g to about 1.4 dL/g, or from about 1.0 dL/g to about 1.4 dL/g as determined according to ASTM D2857-70. In other embodiments, the polyesteramide has an inherent viscosity of at least about 1.0 dL/g, at least about 1.1 dL/g, at least about 1.2 dL/g, at least about 1.3 dL/g, at least about 1.4 dL/g, at least about 1.5 dL/g, at least about 1.6 dL/g, at least about 1.7 dL/g, at least about 1.8 dL/g, at least about 1.9 dL/g, at least about 2.0 dL/g, at least about 2.1 dL/g, at least about 2.2 dL/g, at least about 2.3 dL/g or more as determined according to ASTM D2857-70.

In one embodiment, the melt viscosity of the polyesteramide(s) useful in the invention is less than 30,000 poise as measured a 1 radian/second on a rotary melt rheometer at 280° C. In another embodiment, the melt viscosity of the polyester(s) useful in the invention is less than 20,000 poise, less than 10,000 poise, less than 9,000 poise, less than 8,000 poise, less than 7,000 poise, less than 6,000 poise, as measured at 1 radian/second on a rotary melt rheometer at 280° C. Viscosity at rad/sec is related to processability. Typical polymers of this type have viscosities of less than 10,000 poise as measured at 1 radian/second when measured at their processing temperature.

Also disclosed is a polyesteramide comprising: (a) a diamine component comprising: 1 to 99 mole % of diamine residues derived from a diamine chosen from $(C_{2-20})$alkyl diamine, $CH_2((C_{3-8})cycloalkyl-NH_2)_2$, $H_2N-((C_{1-3})alkyl)_{0-1}-(C_{3-8})cycloalkyl-((C_{1-3})alkyl)_{0-1}-NH_2$, 6- to 8-membered heterocyclyl containing 2 nitrogen atoms, or $H_2N-((C_{1-3})alkyl)_{0-1}-(C_{6-10})bicycloalkyl-((C_{1-3})alkyl)_{0-1}-NH_2$ wherein the bicycloalkyl is unbridged or bridged; (b) a diol component comprising: 1 to 99 mole % of diol residues derived from a diol which is $(C_{3-8})$cycloalkyl diol; (c) a diacid component comprising: 10 to 100 mole % of diacid residues derived from a diacid chosen from $HO_2C-(C_{2-40})$alkylene-$CO_2H$, or $HO_2C-(C_{3-10})cycloalkyl-CO_2H$; wherein each cycloalkyl is unsubstituted or substituted by 1-4 $(C_{1-3})$alkyl, wherein the total mole % of the diacid component is 100 mole %, wherein the total mole % of the combined diol and diamine component is 100 mole %.

In one embodiment, the polyesteramide comprises: (a) a diamine component comprising: 1 to 99 mole % of diamine residues derived from a diamine chosen from $(C_{2-20})$alkyl diamine, $CH_2((C_{3-8})cycloalkyl-NH_2)_2$, $H_2N-((C_{1-3})alkyl)_{0-1}-(C_{3-8})cycloalkyl-((C_{1-3})alkyl)_{0-1}-NH_2$, 6- to 8-membered heterocyclyl containing 2 nitrogen atoms, or $H_2N-((C_{1-3})alkyl)_{0-1}-(C_{6-10})bicycloalkyl-((C_{1-3})alkyl)_{0-1}-NH_2$ wherein the bicycloalkyl is unbridged or bridged; (b) a diol component comprising: 1 to 99 mole % of diol residues derived from a diol which is $(C_{3-8})$cycloalkyl diol; (c) a diacid component comprising: 10 to 100 mole % of diacid residues derived from a diacid chosen from $HO_2C-(C_{2-20})$alkylene-$CO_2H$, or $HO_2C-(C_{3-10})$cycloalkyl-$CO_2H$; wherein each cycloalkyl is unsubstituted or substituted by 1-4 $(C_{1-3})$alkyl, wherein the total mole % of the diacid component is 100 mole %, wherein the total mole % of the combined diol and diamine component is 100 mole %.

In one embodiment, the diol is chosen from cyclobutane-1,3-diol, 2,4-dimethylcyclobutane-1,3-diol, 2,4-diethylcyclobutane-1,3-diol, 2,2-dimethylcyclobutane-1,3-diol, or 2,2,4,4-tetramethylcyclobutane-1,3-diol. In one class of this embodiment, the diol is cyclobutane-1,3-diol. In one class of this embodiment, the diol is 2,4-dimethylcyclobutane-1,3-diol. In one class of this embodiment, the diol is 2,4-diethylcyclobutane-1,3-diol. In one class of this embodiment, the diol is 2-dimethylcyclobutane-1,3-diol. In one class of this embodiment, the diol is 2,2,4,4-tetramethylcyclobutane-1,3-diol. In one subclass of any of these classes, the diol residues are present at from about 15 mole % to about 65 mole %.

In one embodiment, the diol residues are present at from about 5 mole % to about 90 mole %. In another embodiment, the diol residues are present at from about 10 mole % to about 90 mole %, from about 10 mole % to about 80 mole %, from about 15 mole % to about 30 mole %, from about 30 mole % to about 50 mole %, from about 50 mole % to about 70 mole %, or from about 15 mole % to about 65 mole %.

In one embodiment, the diol component further comprises an alkylene glycol residue derived from $H-[-O-CH_2-CH_2-(CH_2)_n-]_m-OH$, wherein n is an integer from 0 to 2; and m is an integer from 2 to 50. In one class of this embodiment, the alkylene glycol residues are present from 0.01 to 10 mole %, from 0.01 to 5 mole %, from 0.01 to 1 mole %, from 0.01 to 0.5 mole %, or from 0.01 to 0.1 mole %.

In one embodiment, the diamine is $(C_{2-20})$alkyl diamine. In one embodiment, the diamine is $CH_2((C_{3-8})cycloalkyl-NH_2)_2$. In one embodiment, the diamine is $H_2N-((C_{1-3})alkyl)_{0-1}-(C_{3-8})cycloalkyl-((C_{1-3})alkyl)_{0-1}-NH_2$. In one class of any of the embodiments, the diol residues are present at from about 35 mole % to about 85 mole %.

In one embodiment, the diamine is a 6- to 8-membered heterocyclyl containing 2 nitrogen atoms. In one embodiment, the diamine is $H_2N-((C_{1-3})alkyl)_{0-1}-(C_{6-10})bicycloalkyl-((C_{1-3})alkyl)_{0-1}-NH_2$ wherein the bicycloalkyl is unbridged or bridged. In one class of either embodiment, the diol residues are present at from about 35 mole % to about 85 mole %.

In one embodiment, the diamine is chosen from 4,4'-methylenebis(2-methylcyclohexylamine), 4,4'-methylenebis(cyclohexylamine), 1,6-hexanediamine, 2,4,5-trimethyl-1,6-hexanediamine, 5-amino-1,3,3-trimethylcyclohexanemethylamine, 1,4-bis(aminomethyl)cyclohexane, or 2,2,4,4-tetramethyl-1,3-cyclobutanediamine, 3(4),8(9)-bis(aminomethyl)tricyclo[5.2.1.0$^{2,6}$]decane, N-Methyl diethanolamine, or a mixture of 2,4,4-trimethyl hexanediamine and 2,2,4-trimethyl hexanediamine. In one class of this embodiment, the diamine is chosen from 4,4'-methylenebis(2-methylcyclohexylamine), or 4,4'-methylenebis(cyclohexylamine). In one class of this embodiment, the diamine is 4,4'-methylenebis(2-methylcyclohexylamine). In one class of this embodiment, the diamine is 4,4'-methylenebis(cyclohexylamine). In one class of this embodiment, the diamine is 1,6-hexanediamine. In one class of this embodiment, the diamine is 2,4,5-trimethyl-1,6-hexanediamine. In one class of this embodiment, the diamine is 5-amino-1,3,3-trimethylcyclohexanemethylamine. In one class of this embodiment, the diamine is 1,4-bis(aminomethyl)cyclohexane. In one class of this embodiment, the diamine is 2,2,4,4-tetramethyl-1,3-cyclobutanediamine. In one class of this embodiment, the diamine is 3(4),8(9)-bis(aminomethyl)tricyclo[5.2.1.0$^{2,6}$]decane. In one class of this embodiment, the diamine is N-Methyl diethanolamine. In one class of this embodiment, the diamine is a mixture of 2,4,4-trimethyl hexanediamine and 2,2,4-trimethyl hexanediamine. In one class of this embodiment, the diamine is 1,3-bis(aminomethyl)cyclohexane. In one subclass of any embodiment of this class, the diol residues are present at from about 35 mole % to about 85 mole %.

In one embodiment, the diamine residues are present at from about 5 mole % to about 90 mole %. In other embodiments, the diamine residues are present at from about 10 mole % to about 90 mole %, from about 10 mole % to about 80 mole %, from about 15 mole % to about 30 mole %, from about 30 mole % to about 50 mole %, from about 50 mole % to about 70 mole %, from about 15 mole % to about 65 mole %, or from about 35 mole % to about 85 mole %.

In one embodiment, the $HO_2C-(C_{2-40})$alkylene-$CO_2H$ is present from about 40 mole % to about 70 mole % and the $HO_2C-(C_{3-10})$cycloalkyl-$CO_2H$ is present from about 30 mole % to about 60 mole %. In one embodiment, the $HO_2C-(C_{2-40})$alkylene-$CO_2H$ is present from about 50 mole % to about 60 mole % and the $HO_2C-(C_{3-10})$cycloalkyl-$CO_2H$ is present from about 40 mole % to about 50 mole %.

In one embodiment, the $HO_2C-(C_{2-20})$alkylene-$CO_2H$ is present from about 40 mole % to about 70 mole % and the $HO_2C-(C_{3-10})$cycloalkyl-$CO_2H$ is present from about 30 mole % to about 60 mole %. In one embodiment, the $HO_2C-(C_{2-20})$alkylene-$CO_2H$ is present from about 50 mole % to about 60 mole % and the $HO_2C-(C_{3-10})$cycloalkyl-$CO_2H$ is present from about 40 mole % to about 50 mole %.

In one embodiment, the diacid is $HO_2C-(C_{2-40})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is $HO_2C-(C_{2-20})$alkylene-$CO_2H$. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is $HO_2C-(C_{3-10})$cycloalkyl-$CO_2H$. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is chosen from succinic acid, glutaric acid, adipic acid, heptanedioic acid, octanedioic acid, nonanedioic acid (e.g., azelaic acid), decanedioic acid (e.g., sebacic acid), undecanedioic acid, dodecanedioic acid, tridecanedioic acid, hexadecanedioic acid, octadecanedioic acid, eicosanedioic acid, 9-[(Z)-non-3-enyl]-10-octyl-nonanedioic acid (dimer acid), 9-nonyl-10-octylnonadecanedioic acid (hydrogenated dimer acid, Pripol 1009), cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is chosen from adipic acid, 1,12-dodecanedioic acid, azelaic acid, sebacic acid, 1,18-octadecanedioic acid, 9-nonyl-10-octylnonadecanedioic acid (hydrogenated dimer acid, Pripol 1009), cyclohexane-1,3-dicarboxylic acid or cyclohexane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol. In one sub-subclass of this subclass, the adipic acid or 1,12-dodecanedioic acid is present from about 40 mole % to about 70 mole % and the cyclohexane-1,3-dicarboxylic acid is present from about 30 mole % to about 60 mole %. In one sub-subclass of this subclass, the adipic acid or 1,12-dodecanedioic acid is present from about 50 mole % to about 60 mole % and the cyclohexane-1,3-dicarboxylic acid is present from about 40 mole % to about 50 mole %.

In one embodiment, the diacid is chosen from succinic acid, glutaric acid, adipic acid, heptanedioic acid, octanedioic acid, nonanedioic acid (e.g., azelaic acid), decanedioic acid (e.g., sebacic acid), undecanedioic acid, dodecanedioic acid, tridecanedioic acid, hexadecanedioic acid, octadecanedioic acid, or eicosanedioic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is chosen from adipic acid, or 1,12-dodecanedioic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is chosen from cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is cyclohexane-1,3-dicarboxylic acid. In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the diacid is 9-nonyl-10-octylnonadecanedioic acid (hydrogenated dimer acid, Pripol 1009). In one class of this embodiment, the diamine is chosen from 4,4'-methylenebis(2-methylcyclohexylamine) or 4,4'-methylenebis(cyclohexylamine). In one subclass of this class, the diol is 2,2,4,4-tetramethylcyclobutane-1,3-diol.

In one embodiment, the polyesteramide further comprises branching agent residues derived from a compound chosen from trimellitic acid, trimethylolpropane, trimethylolethane, glycerol, pentaerythritol, citric acid, tartaric acid, 3-hydroxyglutaric acid, glycerin, erythritol, threitol, dipentaerythritol, sorbitol, trimellitic anhydride, pyromellitic dianhydride, trimesic acid, or dimethylol propionic acid.

In one class of this embodiment, the branching agent residues are present from about 0.001 to about 10 weight % based on the total weight of the polyesteramide. In other classes of this embodiment, the branching agent residues are present from about 0.01 to about 10 weight %, from about 0.001 to about 5 weight %, from about 0.001 to about 1 weight %, from about 0.001 to about 0.05 weight %, or from about 0.001 to about 0.01 weight % based on the total weight of the polyesteramide.

The branching monomer may be added to the polyesteramide reaction mixture or blended with the polyesteramide in the form of a concentrate as described, for example, in U.S. Pat. Nos. 5,654,347 and 5,696,176, whose disclosure regarding branching monomers is incorporated herein by reference.

In one embodiment, the polyesteramide further comprises silane residues derived from an epoxy silane or an isocyanate silane. In one class of this embodiment, the silane residues are present at from about 0.001 to about 10 weight % based on the total weight of the polyesteramide. In other classes of this embodiment, the silane residues are present at from about 0.01 to about 10 weight %, from about 0.001 to about 5 weight %, from about 0.001 to about 1 weight %, from about 0.001 to about 0.05 weight %, or from about 0.001 to about 0.01 weight % based on the total weight of the polyesteramide.

In one embodiment, the polyesteramide has a glass transition temperature of from about 0° C. to about 200° C. as determined by differential scanning calorimetry (DSC). In other classes of this embodiment, the polyesteramide has a glass transition temperature of from about 0° C. to about 20° C., from about 20° C. to about 90° C., from about 40° C. to about 90° C., from about 90° C. to about 130° C., from about 130° C. to about 200° C., or from about 90° C. to about 190° C. as determined by differential scanning calorimetry (DSC).

In one embodiment, the polyesteramide has an inherent viscosity of from about 0.3 dL/g to about 2.0 dL/g or more as determined according to ASTM D2857-70. In other classes of this embodiment, the polyesteramide has an inherent viscosity of from about 0.3 dL/g to about 1.4 dL/g, from about 0.4 dL/g to about 0.8 dL/g, from about 0.4 dL/g to about 0.5 dL/g, from about 0.5 dL/g to about 0.6 dL/g, from about 0.6 dL/g to about 0.7 dL/g, from about 0.7 dL/g to about 0.8 dL/g, from about 0.8 dL/g to about 1.4 dL/g, from about 0.9 dL/g to about 1.4 dL/g, or from about 1.0 dL/g to about 1.4 dL/g as determined according to ASTM D2857-70. In other embodiments, the polyesteramide has an inherent viscosity of at least about 1.0 dL/g, at least about 1.1 dL/g, at least about 1.2 dL/g, at least about 1.3 dL/g, at least about 1.4 dL/g, at least about 1.5 dL/g, at least about 1.6 dL/g, at least about 1.7 dL/g, at least about 1.8 dL/g, at least about 1.9 dL/g, at least about 2.0 dL/g, at least about 2.1 dL/g, at least about 2.2 dL/g, at least about 2.3 dL/g or more as determined according to ASTM D2857-70.

In one embodiment, the melt viscosity of the polyester(s) useful in the invention is less than 30,000 poise as measured a 1 radian/second on a rotary melt rheometer at 280° C. In other embodiments, the melt viscosity of the polyester(s) useful in the invention is less than 20,000 poise, less than 10,000 poise, less than 9,000 poise, less than 8,000 poise, less than 7,000 poise, or less than 6,000 poise as measured at 1 radian/second on a rotary melt rheometer at 280° C. Viscosity at rad/sec is related to processability. Typical polymers have viscosities of less than 10,000 poise as measured at 1 radian/second when measured at their processing temperature.

Compositions

The present application also relates to compositions comprising the polyesteramides disclosed herein. The compositions can further comprise additives known to one skilled in the art. In one embodiment, the compositions further comprise an additive chosen from antioxidants, colorants, mold release agents, flame retardants, plasticizers, nucleating agents, UV stabilizers, UV absorbers, thermal stabilizers, glass fibers, carbon fibers, fillers, impact modifiers, and silanes (such as an epoxy silane or isocyanate silane). In other embodiments, the composition comprises more than one additive.

Examples of commercially available impact modifiers are well known in the art and useful in this invention include, but are not limited to, ethylene-co-glycidyl methacrylate-based impact modifiers, ethylene/propylene terpolymers based impact modifiers, styrene-based block copolymeric impact modifiers, and various acrylic core/shell type impact modifiers.

Thermal stabilizers are compounds known to be effective in stabilizing polyesters during melt processing including but not limited to phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. The number of ester groups present in the particular phosphorus compound can vary from zero up to the maximum allowable based on the number of hydroxyl groups present on the phosphorus compound used.

Examples of thermal stabilizers include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, Merpol A, and methyl diphenyl phosphine.

Reinforcing materials are also useful in the compositions of this invention. The reinforcing materials may include carbon filaments, silicates, mica, clay, talc, titanium dioxide, Wollastonite, glass flakes, glass beads and fibers, and polymeric fibers and combinations thereof. The preferred reinforcing materials are glass, and it is further preferred to use fibrous glass filaments, mixtures of glass and talc, glass and mica, and glass and polymeric fibers.

In one embodiment, the composition can further comprise a polymer chosen from a polyesteramide other than those disclosed herein or having a different diol, diamine and/or diacid, a cellulose ester, a polyvinyl chloride, a nylon, a polyvinyl alcohol, a polyvinyl acetate, a poly(vinyl butyral), a polyester, a polyamide, a polystyrene, a polystyrene copolymer, a styrene acrylonitrile copolymer, an acrylonitrile butadiene styrene copolymer, a poly(methylmethacrylate), an acrylic copolymer, a poly(ethery-imide), a polyphenylene oxide, a polyphenylene sulfide, a polysulfone, a polysulfone ether, or a poly(ether-ketone) of an aromatic dihydroxy compound.

In one class of this embodiment, the polyesteramide is present from about 1 to about 99 wt. % based on the total weight of the composition; and the polymer (other than polyesteramide) is present from about 1 to about 99 wt. % based the total weight of the composition. In one class of this embodiment, the polyesteramide is present from about 5 to about 95 wt. % based on the total weight of the composition; and the polymer is present from about 5 to about 95 wt. % based the total weight of the composition, although other amounts may be used depending on the desired properties.

Interlayers, Sheets and Films

The present application also relates to layers, interlayers, sheets or films comprising the polyesteramides or compositions disclosed herein. In embodiments, the polyesteramide may be amorphous, while in other embodiments the polyesteramide may be semi-crystalline. The methods of forming the layers, interlayers, sheets or films comprising the polyesteramides or compositions disclosed herein are well known in the art. Such layers, interlayers, sheets or films may be produced from the polyesteramides or compositions according to various embodiments of the present invention using any suitable method and include but not limited to extrusion, co-extrusion, calendaring, compression molding, injection molding, and solution casting.

As used herein, the term "interlayer" refers to a single layer or multiple layer polymer sheet suitable for use in forming a multiple layer panel. Multiple layer panels are typically formed by sandwiching the interlayer between two substrates, which can be formed from a rigid material such as glass and laminating the assembly to form a multiple layer laminated panel. Multiple layer panels may be formed using a single layer or multiple layer interlayer. As used herein, the terms "layer", "single layer" and "monolithic" refer to interlayers formed of one single polymer layer, while the terms "multiple layer" or "multilayer" refer to interlayers having two or more polymer layers adjacent to and in contact with one another. As used herein, "layer" and "interlayer" may be used interchangeably. Each polymer layer of an interlayer may include one or more polymeric resins, optionally combined with one or more plasticizers (depending on the type of polymeric resin(s) and desired properties), which have been formed into a sheet. One or more of the polymer layers may further include additional additives, although these are not required. For multilayer interlayers, and particularly for multiple layers of different polymers or materials, the layers may be treated to improve interfacial adhesion, or an additive, such as a silane-containing agent, may be added to promote or improve the adhesion between layers. An adhesive layer or coating (such as a tie layer) may also be used between two polymer layers to improve adhesion between the layers, particularly layers of different polymers.

The polymeric resin or resins utilized in polymer layers as described herein may comprise one or more thermoplastic polymer resins. In some embodiments, the thermoplastic resin or resins may be present in the polymer layer in an amount of at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, at least about 96, at least about 97, at least about 98, or at least about 99 weight percent or more based on the total weight of the polymer layer. When two or more resins are present, each may be present in an amount of at least about 0.5, at least about 1, at least about 2, at least about 5, at least about 10, at least about 15, at least about 20, at least about 25, at least about 30, at least about 35, at least about 40, at least about 45, or at least about 50 weight percent, based on the total weight of the polymer layer.

In embodiments, the diamine is chosen from 4,4'-methylenebis(2-methylcyclohexylamine), 4,4'-methylenebis(cyclohexylamine), 3(4),8(9)-bis(aminomethyl)tricyclo[5.2.1.0$^{2,6}$]decane, N-Methyl diethanolamine, a mixture of 2,4,4-trimethyl hexanediamine and 2,2,4-trimethyl hexanediamine, or a mixture of thereof. In embodiments, the diamine is 4,4'-methylenebis(2-methylcyclohexylamine). In embodiments, the diamine is present in an amount of from 20 to 75 mole %. In embodiments, the diamine is present in an amount of from 20 to 40 mole %, from 40 to 60 mole %, from 45 to 55 mole %, from 45 to 50 mole %, or at least 20 mole % or up to 75 mole %.

In embodiments, the diol is chosen from 2,2,4,4-tetramethylcyclobutane-1,3-diol, 1,3-cyclohexanedimethanol, 1,4-cyclohexanedimethanol, 1,4-butanediol, 1,6-hexanediol, or polytetrahydrofuran diol. In embodiments, the diol is 1,3-cyclohexanedimethanol. In embodiments, the diol is 1,4-cyclohexandimethanol. In embodiments, at least two diols are present. In embodiments, the diol is present in an amount of from 40 to 80 mole %. In embodiments, the diamine is present in an amount of from 40 to 70 mole %, from 40 to 60 mole %, from 50 to 60 mole %, or from 50 to 55 mole %.

In embodiments, the diacid is chosen from succinic acid, glutaric acid, adipic acid, heptanedioic acid, octanedioic acid, nonanedioic acid, decanedioic acid, undecanedioic acid, dodecanedioic acid, tridecanedioic acid, hexadecanedioic acid, octadecanedioic acid, eicosanedioic acid, 9-[(Z)-non-3-enyl]-10-octylnonadecanedioic acid, 9-nonyl-10-octylnonadecanedioic acid, cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid, hydrogenated dimer acid or a mixture of two or more diacids thereof. In embodiments, the diacid is chosen from adipic acid, sebacic acid, azelaic acid, dodecanedioic acid, cyclohexane-1,3-dicarboxylic acid, cyclohexane-1,4-dicarboxylic acid or hydrogenated dimer acid or a mixture of two or more diacids thereof. In embodiments, there are two diacids.

In embodiments, the polyesteramide further comprises a branching agent derived from a compound chosen from trimellitic acid, trimethylolpropane, trimethylolethane, glycerol, pentaerythritol, citric acid, tartaric acid, 3-hydroxyglutaric acid, glycerin, erythritol, threitol, dipentaerythritol, sorbitol, trimellitic anhydride, pyromellitic dianhydride, trimesic acid or dimethylol propionic acid. In embodiments, the branching agent is present from about 0.01 to about 10 weight % based on the total weight % of the polyesteramide.

In embodiments, the polyesteramide comprises a silane additive, such as an epoxy silane or an isocyanate silane, as previously described.

In embodiments, the interlayer has a glass transition temperature of at least 40° C. In embodiments, the interlayer has a glass transition temperature of at least 50° C., at least 55° C. at least 60° C., at least 65° C., at least 70° C. or more as determined according to DMTA. In other embodiments, the interlayer has a glass transition temperature of less than 40° C., less than 35° C., less than 30° C., or less than 25° C. as determined according to DMTA. In embodiments, the layer or interlayer has a glass transition temperature of at least −35° C., at least 0° C., at least 5° C., at least 10° C. or more.

In embodiments, the polyesteramide has an inherent viscosity of at least about 0.5 dL/g, at least about 0.6 dL/g, at least about 0.7 dL/g, at least about 0.8 dL/g, at least about 0.9 dL/g, or at least about 1.0 dL/g as determined according to ASTM D2857-70. In embodiments, the polyesteramide has an inherent viscosity of at least about 1.05 dL/g, at least 1.10 dL/g, at least 1.15 dL/g, at least 1.20 dL/g, at least about 1.3 dL/g, at least about 1.4 dL/g, at least about 1.5 dL/g, at least about 1.6 dL/g, at least about 1.7 dL/g, at least about 1.8 dL/g, at least about 1.9 dL/g, at least about 2.0 dL/g, at least about 2.1 dL/g, at least about 2.2 dL/g, at least about 2.3 dL/g or more as determined according to ASTM D2857-70.

In embodiments, the diamine is chosen from 4,4'-methylenebis(2-methylcyclohexylamine), or 4,4'-methylenebis(cyclohexylamine). In embodiments, the diamine is 4,4'-methylenebis(2-methylcyclohexylamine). In embodiments, the diamine is a mixture of 4,4'-methylenebis(2-methylcyclohexylamine) and 4,4'-methylenebis(cyclohexylamine). In embodiments, the diamine is present in an amount of from 20 to 60 mole %.

In embodiments, the diol is chosen from 1,3-cyclohexanedimethanol or 1,4-cyclohexanedimethanol. In embodiments, the diol is 1,3-cyclohexanedimethanol. In embodiments, the diol is 1,4-cyclohexanedimethanol. In embodiments, two or more diols are present. In embodiments, the diol is present in an amount of from 40 to 80 mole %.

In embodiments, the diacid is chosen from succinic acid, glutaric acid, adipic acid, heptanedioic acid, octanedioic acid, nonanedioic acid, decanedioic acid, undecanedioic acid, dodecanedioic acid, tridecanedioic acid, hexadecanedioic acid, octadecanedioic acid, eicosanedioic acid, 9-[(Z)-non-3-enyl]-10-octylnonadecanedioic acid, 9-nonyl-10-octylnonadecanedioic acid, cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid. In embodiments, the diacid is chosen from adipic acid, sebacic acid, azelaic acid, dodecanedioic acid, cyclohexane-1,3-dicarboxylic acid, cyclohexane-1,4-dicarboxylic acid or hydrogenated dimer acid. In embodiments, two or more diacids are present.

In embodiments, the polyesteramide has an inherent viscosity of at least about 0.5 dL/g, at least about 0.6 dL/g, or at least about 0.7 dL/g as determined according to ASTM D2857-70. In embodiments, the polyesteramide has an inherent viscosity of at least about 0.8 dL/g, at least about 0.9 dL/g, at least about 1.0 dL/g, at least about 1.05 dL/g, at least 1.10 dL/g, at least 1.15 dL/g, at least 1.20 dL/g, at least about 1.3 dL/g, at least about 1.4 dL/g, at least about 1.5 dL/g, at least about 1.6 dL/g, at least about 1.7 dL/g, at least about 1.8 dL/g, at least about 1.9 dL/g, at least about 2.0 dL/g, at least about 2.1 dL/g, at least about 2.2 dL/g, at least about 2.3 dL/g or more as determined according to ASTM D2857-70.

In embodiments, the interlayer has a glass transition temperature of at least −30° C. as measured by DMTA. In embodiments, the interlayer has a glass transition temperature of at least −30° C., at least −20° C., at least −10° C., at least 0° C., at least 5° C., at least 10° C., or at least 15° C. or more as measured by DMTA.

The layers comprising polyesteramides may be used alone as interlayers or in combination with layers comprising other thermoplastic polymers. Examples of suitable thermoplastic polymers can include, but are not limited to, polyvinyl acetal polymers (PVA) (such as poly(vinyl butyral) (PVB) or poly(vinyl isobutyral), an isomer of poly(vinyl butyral) and also referred as PVB or PVisoB, aliphatic polyurethanes (PU), poly(ethylene-co-vinyl acetate) (EVA), poly(vinyl chlorides) (PVC), poly(vinylchloride-co-methacrylate), polyesters, polyamides, polyethylenes, polyolefins, silicone elastomers, epoxy resins, ethylene acrylate ester copolymers, poly(ethylene-co-butyl acrylate), and acid copolymers such as ethylene/carboxylic acid copolymers and its ionomers, derived from any of the foregoing possible thermoplastic resins, combinations of the foregoing, and the like. Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether-based polyurethanes having glass transition temperatures less than 20° C. (commercially available from Thermedics Inc. of Woburn, MA). EVA polymers (or copolymers) can contain various amounts of vinyl acetate groups. The desirable vinyl acetate content is generally from about 10 to about 90 mol %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont, Wilmington, Delaware). In some embodiments, the thermoplastic polymer can be selected from the group consisting of poly(vinyl acetal) resins, poly(vinyl chloride), poly(ethylene-co-vinyl) acetates, and polyurethanes, while in other embodiments, the polymer can comprise one or more poly(vinyl acetal) resins. When an interlayer includes more than one polymer layer, each layer may include the same type of thermoplastic polymer resin, or one or more layers may include at least one different type of resin.

The layer or interlayer may also be used with other types of polymers or polymer layers, such as a cellulose ester, a polyvinyl chloride, a nylon, a polyester, a polyamide, a polystyrene, a polystyrene copolymer, a styrene acrylonitrile copolymer, an acrylonitrile butadiene styrene copolymer, a poly(methylmethacrylate), an acrylic copolymer, a poly(ethery-imide), a polyphenylene oxide, a polyphenylene sulfide, a polysulfone, a polysulfone ether, or a poly(ether-ketone) of an aromatic dihydroxy compound.

Thermoplastic polymer resins used in one or more layers may be formed by any suitable method. In embodiments, when the thermoplastic polymer resins include poly(vinyl acetal) resins, such resins may be formed by acetalization of poly(vinyl alcohol) with one or more aldehydes in the presence of a catalyst according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.). The resulting poly(vinyl acetal) resins may include at least about 50, at least about 60, at least about 70, at least about 75, at least about 80, at least about 85, or at least about 90 weight percent of residues of at least one aldehyde, measured according to ASTM 1396 as the percent acetalization of the resin. The total amount of aldehyde residues in a poly(vinyl acetal) resin can be collectively referred to as the acetal content, with the balance of the poly(vinyl acetal) resin being residual hydroxyl groups (as vinyl hydroxyl groups) and residual ester groups (as vinyl acetate groups), which will be discussed in further detail below.

Suitable poly(vinyl acetal) resins may include residues of any aldehyde and, in some embodiments, may include residues of at least one $C_4$ to $C_8$ aldehyde. Examples of suitable $C_4$ to $C_8$ aldehydes can include, for example, n-butyraldehyde, i-butyraldehyde (also referred to as iso-butyraldehyde), 2-methylvaleraldehyde, n-hexyl aldehyde, 2-ethylhexyl aldehyde, n-octyl aldehyde, and combinations thereof. One or more of the poly(vinyl acetal) resins utilized in the layers and interlayers described herein can include at least about 20, at least about 30, at least about 40, at least about 50, at least about 60, or at least about 70 weight percent of residues of at least one $C_4$ to $C_8$ aldehyde, based on the total weight of aldehyde residues of the resin. Alternatively, or in addition, the poly(vinyl acetal) resin may include not more than about 99, not more than about 95, not more than about 90, not more than about 85, not more than about 80, not more than about 75, not more than about 70, or not more than about 65 weight percent of at least one $C_4$ to $C_8$ aldehyde. The $C_4$ to $C_8$ aldehyde may be selected from the group listed above, or it can be selected from the group consisting of n-butyraldehyde, i-butyraldehyde, 2-ethylhexyl aldehyde, and combinations thereof.

In various embodiments, the poly(vinyl acetal) resin may be a poly(vinyl butyral) (PVB) resin that primarily comprises residues of n-butyraldehyde, and may, for example, include not more than about 30, not more than about 20, not more than about 10, not more than about 5, not more than about 2, or not more than 1 weight percent of residues of an aldehyde other than n-butyraldehyde. Typically, the aldehyde residues other than n-butyraldehyde present in poly (vinyl butyral) resins may include iso-butyraldehyde, 2-ethylhexyl aldehyde, and combinations thereof. When the poly (vinyl acetal) resin comprises a poly(vinyl butyral) resin, the weight average molecular weight of the resin can be at least about 30,000, at least about 40,000, at least about 50,000, at least about 65,000, at least about 75,000, at least about 85,000, at least about 100,000, or at least about 125,000 Daltons and/or not more than about 500,000, not more than about 450,000, not more than about 300,000, not more than about 350,000, not more than about 300,000, not more than about 250,000, not more than about 200,000, not more than about 170,000, not more than about 160,000, not more than about 155,000, not more than about 150,000, not more than about 140,000, or not more than about 135,000 Daltons, measured by size exclusion chromatography using low angle laser light scattering (SEC/LALLS) method of Cotts and Ouano in tetrahydrofuran.

In general, poly(vinyl acetal) resins can be produced by hydrolyzing a poly(vinyl acetate) to poly(vinyl alcohol), and then acetalizing the poly(vinyl alcohol) with one or more of the above aldehydes to form a poly(vinyl acetal) resin. In the process of hydrolyzing the poly(vinyl acetate), not all the acetate groups are converted to hydroxyl groups, and, as a result, residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl groups) and residual acetate groups (as vinyl acetate groups) as part of the polymer chain. As used herein, the terms "residual hydroxyl content" and "residual acetate content" refer to the amount of hydroxyl and acetate groups, respectively, that remain on a resin after processing is complete. Both the residual hydroxyl content and the residual acetate content are expressed in weight percent, based on the weight of the polymer resin, and are measured according to ASTM D-1396.

One or more polymer layers may also include at least one plasticizer. When present, the plasticizer content of one or more polymer layers can be at least about 2, at least about 5, at least about 6, at least about 8, at least about 10, at least about 15, at least about 20, at least about 25, at least about 30, at least about 35, at least about 40, at least about 45, at least about 50, at least about 55, at least about 60, at least about 65, at least about 70, at least about 75, or at least about 80 parts per hundred resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, not more than about 40, or not more than about 35 phr. In some embodiments, one or more polymer layers can have a plasticizer content of less than 35, not more than about 32, not more than about 30, not more than about 27, not more than about 26, not more than about 25, not more than about 24, not more than about 23, not more than about 22, not more than about 21, not more than about 20, not more than about 19, not more than about 18, not more than about 17, not more than about 16, not more than about 15, not more than about 14, not more than about 13, not more than about 12, not more than about 11, or not more than about 10 phr.

As used herein, the term "parts per hundred resin" or "phr" refers to the amount of plasticizer present per one hundred parts of resin, on a weight basis. For example, if 30 grams of plasticizer were added to 100 grams of a resin, the plasticizer content would be 30 phr. If the polymer layer includes two or more resins, the weight of plasticizer is compared to the combined amount of all resins present to determine the parts per hundred resin. Further, when the plasticizer content of a layer or interlayer is provided herein, it is provided with reference to the amount of plasticizer in the mix or melt that was used to produce the layer or interlayer, unless otherwise specified.

Any suitable plasticizer can be used in the polymer layers described herein. The plasticizer may have a hydrocarbon segment of at least about 6 and/or not more than about 30, not more than about 25, not more than about 20, not more than about 15, not more than about 12, or not more than about 10 carbon atoms. Examples of plasticizers include esters of a polybasic acid or a polyhydric alcohol, among others. More specific examples of suitable plasticizers include, but are not limited to, triethylene glycol di-(2-ethylhexanoate) ("3GEH"), triethylene glycol di-(2-ethylbutyrate), tetraethylene glycol di-(2-ethylhexanoate) ("4GEH"), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. In some embodiments, the plasticizer may comprise, or consist of, 3GEH. Other examples of plasticizers can include phosphate esters, epoxidized oil, solid state plasticizers, fire retardant plasticizers, and combinations thereof.

Additionally, one or more polymer layers of the present invention may include at least one plasticizer having a refractive index greater than about 1.460, or greater than 1.470, or greater than 1.480. Examples of such plasticizers can include, but are not limited to, esters of a polybasic acid or a polyhydric alcohol, polyadipates, epoxides, phthalates, terephthalates, benzoates, toluates, mellitates and other specialty plasticizers. Further examples include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In some embodiments, the plasticizer can be selected from the group consisting of dipropylene glycol dibenzoates, tripropylene glycol dibenzoates, and combinations thereof.

Additionally, any of the additional polymer layers may also include other types of additives that can impart particular properties or features to the polymer layer or interlayer. Such additives can include, but are not limited to, adhesion control agents ("ACAs"), dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, as well as any additives previously described. Specific types and amounts of such additives may be selected based on the final properties or end use of a particular layer or interlayer.

The various polymer layers described herein may exhibit a wide range of glass transition temperatures. In some embodiments, interlayers including two or more polymers or polymer layers can exhibit two or more glass transition temperatures. The glass transition temperature ($T_g$) of a polymeric material is the temperature that marks the transition of the material from a glass state to a rubbery state. The glass transition temperatures of the polymer layers can be determined by dynamic mechanical thermal analysis (DMTA) according to the following procedure. A polymer sheet is molded into a sample disc of 8 millimeters (mm) in diameter. The polymer sample disc is placed between two parallel plate test fixtures of a Rheometrics Dynamic Spectrometer II. The polymer sample disc is tested in shear mode at an oscillation frequency of 1 Hertz as the temperature of the sample is increased from 20 to 100° C. at a rate of 3° C./minute. The position of the maximum value of tan delta (damping) plotted as dependent on temperature is used to determine the glass transition temperature. Experience indicates that the method is reproducible to within +/−1° C. When a polymer layer or interlayer includes two or more polymer layers, at least one of the layers may have a glass transition temperature different from one or more other polymer layers within the interlayer.

In some embodiments, the interlayers described herein can include at least a first outer polymer layer and a second outer polymer layer. As used herein, the term "outer" refers to the outermost layer or layers of an interlayer. Typically, the outer polymer layers are configured to be in contact with a substrate when the interlayer is laminated to the substrate, or to one of a pair of substrates when the interlayer is used to form a multiple layer panel. In some embodiments, each of the first and second outer polymer layers can include respective first and second thermoplastic polymer resins disclosed herein (and an optional plasticizer or other additives). In some embodiments, each of the first and second outer polymer layers can include respective first and second poly(vinyl acetal) resins and an optional plasticizer, and the resins may have residual hydroxyl contents and residual acetate contents within one or more of the ranges provided above. Similarly, each of the first and second polymer layers can include at least one plasticizer of a type and in the amounts described above, so that the layers may also have a glass transition temperature as previously described. In other embodiments, depending on the polymer(s) used in the layer(s), the outer layer(s) may also have an adhesive, coating, or tie layer to facilitate bonding to a substrate such as glass.

According to some embodiments, the first and second outer polymer layers may be adjacent to and in contact with one another, such that the first and second outer polymer layers are the only two layers of the interlayer. In other embodiments, at least 1, at least 2, at least 3, at least 4, or at least 5 or more polymer layers may be disposed between and in contact with at least one of the first and second outer polymer layers. These additional layers, when present, may have compositions similar to, or different than, each of the first and second polymer layers and may include one or more of the polymers described above. Further, as described above, the outer layer(s) may also have an adhesive, coating, tie layer or treatment to facilitate bonding to a substrate such as glass.

One or more layers may also be formed of other materials, such as a polymer film formed from polyethylene terephthalate (PET), and the polymer film may include various metallic, metal oxide, or other non-metallic materials or layers and may be coated or otherwise surface-treated. In some embodiments, one or more of the additional layers may comprise functional layers such including, for example, IR reducing layers, holographic layers, photochromic layers, electrochromic layers, antilacerative layers, heat strips, antennas, solar radiation blocking layers, decorative layers, and the like.

In some embodiments, the interlayer can include at least a first polymer layer, a second polymer layer, and a third polymer layer, wherein the second polymer layer is disposed between and in contact with each of the first and third polymer layers. In the first and third polymer layers can include at least one polyesteramide composition of the types and in the amounts described in detail previously, and the second (or middle) layer may include a different polyesteramide composition as previously described. In embodiments, the first and third polymer layers can include at least one polyesteramide composition of the types and in the amounts described in detail previously, and the second (or middle) layer may include a different polymer resin, such as a polycarbonate. In embodiments, the first and third polymer layers can include at least one poly(vinyl acetal) resin and an optional plasticizer of the types and in the amounts described in detail previously, and the second (or middle) layer may include a polyesteramide layer as previously described. In embodiments, the first and third polymer layers can include at least polymer resin different from the polyesteramides disclosed herein (i.e., a non-polyesteramide), and the second (or middle) layer may include a polyesteramide layer as previously described. Depending on the desired properties, relatively "soft" (i.e., lower glass transition temperature) outer polymer layers can sandwich a "stiff" (i.e., relatively higher glass transition temperature) inner layer, which facilitates both enhanced rigidity and impact resistance in multiple layer panels formed from the interlayer. Additional layers may also be included.

When three or more layers are employed in the multilayered interlayers, some of the layers can be referred to as skin (or outer) layers and one or more may be referred to as core (or inner) layers. As used herein, "skin layer" generally refers to outer layers of the interlayer and "one or more core layers" generally refers to one or more of the inner layer(s) disposed between the skin layers. At least one side of a core layer can be in direct contact with at least one side of a skin layer or may be in indirect contact with a skin layer through a tie layer, a coating or adhesive agent.

Exemplary multilayer interlayer embodiments include, but are not limited to: non-polyesteramide//polyesteramide//non-polyesteramide; non-polyesteramide//polyesteramide; non-polyesteramide//polyesteramide//polyesteramide//non-polyesteramide; non-polyesteramide//polyesteramide//non-polyesteramide//polyesteramide//non-polyesteramide; non-polyesteramide//polyesteramide//polyesteramide//non-polyesteramide//non-polyesteramide; polyesteramide//non-polyesteramide//polyesteramide; polyesteramide//non-polyesteramide//non-polyesteramide//polyesteramide; polyesteramide//non-polyesteramide//polyesteramide//non-polyesteramide//polyesteramide; or polyesteramide//non-polyesteramide//non-polyesteramide//polyesteramide. Other embodiments are possible, as would be known to one skilled in the art. The polyester and non-polyesteramide layer(s) may be any polymer layer previously described. Further, additional coatings or layers, such as an adhesive or tie layer, may be included in any embodiments as desired.

In embodiments, the layer or interlayer is a monolithic interlayer. In embodiments, the interlayer comprises at least two layers. In embodiments, the interlayer comprises at least three layers, wherein at least one layer comprises a polyesteramide as previously described. In embodiments, the interlayer comprises at least three layers, wherein at least two layers comprise a polyesteramide as previously described. In embodiments, the interlayer comprises more than three layers, wherein at least one layer comprises a polyesteramide as previously described.

In embodiments, the layer or interlayer has a % haze (as measured in accordance with ASTM D1003-61 (reapproved 1977)—Procedure B using Illuminant C, at an observer angle of 2 degrees on an interlayer having a thickness of 0.76 millimeters) of less than 5.0. In embodiment, the layer or interlayer has a % haze (as measured in accordance with ASTM D1003-61 (reapproved 1977)—Procedure B using Illuminant C, at an observer angle of 2 degrees on an interlayer having a thickness of 0.76 millimeters) of less than 4.0, less than 3.5, less than 3.0, less than 2.5, less than 2.0, or less than 1.5.

In embodiments, the layer or interlayer has excellent color or yellowness index, YI, measured according to ASTM Method E313 (formerly D-1925) (illuminant C, 2° observer angle). In embodiments, the layer or interlayer has a YI of less than 2.5, less than 2.0, less than 1.5 or less than 1.0 measured according to ASTM Method E313 (formerly D-1925) (illuminant C, 2° observer angle).

Layers and interlayers according to various embodiments of the present invention may exhibit enhanced properties as compared to conventional interlayers. For example, in contrast to comparative interlayers used for architectural applications, interlayers as described herein may exhibit both high rigidity and good impact performance, while still retaining suitable or even excellent optical characteristics. As a result, interlayers as described herein may suitably be utilized in many structural and load-bearing applications, subject to various pressures, temperature changes, and impacts, while maintaining both suitable performance and aesthetic value and properties.

Interlayers as described herein may exhibit an enhanced rigidity. Rigidity of a polymer layer or interlayer may be characterized by its shear storage modulus (G'), measured at 50° C. (and, in some cases, at other temperatures, as described below) according to ASTM D4065-12. In some embodiments, a polymer layer or interlayer as described herein may have a shear storage modulus (G') at 50° C. of at least about 4, at least about 5, at least about 10, at least about 20, at least about 30, at least about 40, at least about 50, at least about 60, at least about 70, at least about 80, at least about 90, at least about 100, at least about 110, at least about 120, at least about 130, at least about 140 MPa, at least about 150 MPa, at least about 160 MPa, at least about 170 MPa, at least about 180 MPa, at least about 190 MPa, at least about 200 MPa, at least about 210 MPa, or at least about 220 MPa. There is no particular upper limit, although practically, the layer or interlayer may exhibit a shear storage modulus as high as 250 MPa or even as high as 280 MPa or more at 50° C.

In addition to enhanced rigidity, interlayers according to embodiments of the present invention can exhibit desirable impact resistance, as characterized by the break height (or mean break height) of the interlayer, when having a thickness of 30 mils and when laminated between two sheets of 3-mm thick clear glass, measured according to ANSI/SAE Z26.1-1996 at a temperature of about 70° F. (about 21° C.). In some embodiments, the interlayers as described herein can have a break height, measured as described above, of at least about 12, at least about 12.5, at least about 13, at least about 13.5, at least about 14, at least about 14.5, at least about 15, at least about 15.5, at least about 16, at least about 16.5, at least about 17, at least about 17.5, at least about 18, at least about 18.5, at least about 19, at least about 19.5, at least about 20, at least about 20.5, at least about 21, at least about 21.5, at least about 22, at least about 22.5, at least about 23, at least about 23.5, at least about 24, at least about 24.5, or at least about 25 feet, at least about 25.5, at least about 26, at least about 26.5, at least about 27, at least about 27.5, at least about 28, or at least about 28.5 feet or more. Break height can also be measured at other thicknesses. In embodiments, the higher the break height, the better.

The values for break height (or mean break height) provided herein were obtained using an interlayer having a known thickness (30 mils) laminated between two 3-mm thick sheets of glass. The specification of values for these parameters is not intended to, in any way, limit the thickness of the interlayers described herein or the configuration of multiple layer panels according to embodiments of the present invention. Rather, specification of values for these parameters is intended to provide a definite test for determining the impact resistance, measured as mean break height, exhibited by an interlayer, and the test is measured at a known thickness and if necessary, normalized to a constant thickness (such as 30 mils or 45 mils) so that different interlayers can be compared at the same interlayer thickness. In many of the examples herein, only one interlayer was tested due to material availability for a given composition, therefore the data provided is simply a break height rather than a mean break height.

Pummel adhesion is another parameter that may be used to describe the interlayers disclosed herein. The Pummel Adhesion Test measures the adhesion level of glass to the interlayer in a laminate construction. The interlayer to glass adhesion has a large effect on the impact resistance and long-term stability of glass-interlayer structures. In this test, the laminates are either cooled to 0° F. (−18° C.) or conditioned at room temperature of 70° F. (21° C.) and manually pummeled with a 1 lb. (0.45 kg) hammer on a steel plate at a 45° angle. The samples are then allowed to come to room temperature and all broken glass unadhered to the interlayer is then removed. The amount of glass left adhered to the interlayer is visually compared with a set of standards. The standards correspond to a scale in which varying degrees of glass remained adhered to the interlayer. For example, at a pummel standard of zero, essentially no glass is left adhered to the interlayer. On the other hand, at a pummel standard of ten, essentially 100 percent of the glass remains adhered to the interlayer. Pummel values are grouped and averaged for like specimens. Reported values state the average pummel value for the group and the maximum range of the pummel adhesion rating for individual surfaces. The interlayers described herein may have a pummel adhesion rating of 2 or greater, or 9 or less, or from about 2 to about 9.

In addition to enhanced rigidity and impact performance, interlayers according to embodiments of the present invention also exhibit suitable optical properties, which may vary depending on the ultimate end use. Clarity is one parameter used to describe the optical performance of the interlayers described herein and may be determined by measuring haze value or percent. Haze value represents the quantification of light scattered by a sample in contrast to the incident light. The test for determining haze value is performed with a hazemeter on a polymer sample which has been laminated between two sheets of clear glass, each having a thickness of 3 mm.

When the interlayer is used in a multiple layer panel for which a high level of optical clarity is desired, such as, for example, in clear windows or windshields, the interlayer may be transparent or nearly transparent. In some embodiments, interlayers of the present invention may have a haze value of less than about 5, less than about 4, less than about 3, less than about 2, or less than about 1 percent, as measured in accordance with ASTM D1003-61 (reapproved 1977)—Procedure B using Illuminant C, at an observer angle of 2 degrees on an interlayer having a thickness of 0.76 millimeters. In other embodiments, when haze is less important, the interlayer may have a higher haze value, such as, for example, at least about 25, at least about 30, or at least about 40 percent.

Yellowness Index ("YI") is another measure of optical quality. Yellowness Index of a polymer sheet is measured by laminating (and autoclaving) a 30 gauge (30 mil or 0.76 mm) sheet sample between two pieces of 2.3 mm clear glass using the HunterLab UltraScan XE according to ASTM Method E313 (formerly D-1925) (illuminant C, 2° observer angle) from spectrophotometric light transmittance in the visible spectrum. In various embodiments, the interlayers can exhibit a yellowness index of less than 2.5, less than 2.0, less than 1.5, less than 1.0, less than 0.75, less than 0.5, less than 0.4, or less than 0.3 according to ASTM E313.

Another parameter used to determine the optical performance is percent visual transmittance (% $T_{vis}$), which is measured on the HunterLab UltraScan XE, commercially available from Hunter Associates (Reston, VA). The values may be obtained by analyzing a polymer sample which has been laminated between two sheets of clear glass, each having a thickness of 3 mm (commercially available from Pittsburgh Glass Works of Pennsylvania). In some embodiments, when clear multiple layer panels are desired, the interlayers of the present invention can have a percent visual transmittance of at least about 80, at least about 81, at least about 82, at least about 83, at least about 84, at least about 85, at least about 85.5, at least about 86, at least about 86.5, at least about 87, at least about 87.5, or at least about 88, at least about 88.5 percent or higher.

In embodiments when the transparency and/or haze of the interlayer is not as important, the interlayer, or panel formed therefrom, may be translucent, at least partially opaque, or totally opaque. Examples of applications for such panels include privacy glass or other similar end uses. According to some embodiments, such an interlayer may have, for example, a haze value greater than about 30 percent. Alternatively, or in addition, the interlayer may have a visual transmittance of least about 2 percent, at least about 5 percent, at least about 10 percent and/or not more than about 40 percent, not more than about 35 percent, or not more than about 30 percent. Additionally, in some embodiments, the interlayers as described herein may have a reflectance (% R) greater than 5 percent, at least about 10 percent, or at least about 15 percent and/or not more than about 50, not more than about 45, or not more than about 40 percent, measured according to ASTM E-1164. Other values of reflectance, transmittance, and haze may also be possible, depending on the particular end use. Further, the levels of reflectance, transmittance, and haze may be controlled according to any suitable method including, for example, inclusion of additives, colorants, dyes, and other similar components.

The interlayers of the present invention can be formed according to any suitable method. Exemplary methods can include, but are not limited to, solution casting, compression molding, injection molding, melt extrusion, melt blowing, and combinations thereof. Multilayer interlayers including two or more polymer layers may also be produced according to any suitable method such as, for example, co-extrusion, blown film, melt blowing, dip coating, solution coating, blade, paddle, air-knife, printing, powder coating, spray coating, lamination, and combinations thereof.

According to various embodiments of the present invention, the layers or interlayers may be formed by extrusion or co-extrusion. In an extrusion process, one or more thermoplastic resin(s), optional plasticizer(s), and, optionally, one or more additives as described previously, can be pre-mixed and fed into an extrusion device. The extrusion device is configured to impart a particular profile shape to the thermoplastic composition in order to create an extruded sheet. The extruded sheet, which is at an elevated temperature and highly viscous throughout, can then be cooled to form a polymeric sheet. Once the sheet has been cooled and set, it may be cut and rolled for subsequent storage, transportation, and/or use as an interlayer.

Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

The overall average thickness of interlayers according to various embodiments of the present invention can be at least about 10, at least about 15, at least about 20, at least about 25, at least about 30, at least about 35 mils, at least about 40, at least about 45, at least about 50, at least about 55, at least about 60, at least about 65, at least about 70, at least about 75, at least about 80, at least about 85, at least about 90 or more, although other thicknesses are possible depending on the application and desired properties. If the interlayer is not laminated between two substrates, its average thickness can be determined by directly measuring the thickness of the interlayer using a caliper, or other equivalent device. If the interlayer is laminated between two substrates, its thickness can be determined by subtracting the combined thickness of the substrates from the total thickness of the multiple layer panel. Although the above refer to thicknesses of an individual interlayer, it should be understood that two or more individual interlayers can be stacked or otherwise assembled together to form a composite interlayer having a greater thickness, which may then be laminated between various types of substrates for certain end use applications.

In some embodiments, one or more polymer layers can have an average thickness of at least about 1, at least about 2, at least about 3, at least about 4, at least about 5, at least about 6, at least about 7, at least about 8, at least about 9, at least about 10, at least about 15, at least about 20, at least about 25, at least about 30 mils or more, depending on the desired properties and end use.

Interlayers according to various embodiments of the present invention may be utilized in a multiple layer panel comprising a layer or an interlayer(s) and at least one substrate onto which the interlayer is laminated. Any suitable substrate may be used and, in some embodiments, may be selected from the group consisting of glass, polycarbonate, acrylic, and combinations thereof. In general, the substrates in a multiple layer panel are formed from rigid and generally transparent materials such as those listed above. However, in other embodiments, the multiple layer panel may include only one rigid substrate, an interlayer and at least one polymer film disposed on the layer or interlayer, forming a multiple layer panel referred to as a "bilayer." In some embodiments, the interlayer utilized in a bilayer may include a multilayer interlayer, while in other embodiments, a monolithic interlayer may be used. In other embodiments, a polymer film may be included in a multiple layer panel having two rigid substrates, where the polymer film(s) may be between two layers of interlayer, such as encapsulated between two layers of interlayer. The use of a polymer film in multiple layer panels as described herein may enhance the optical character of the final panel, while also providing other performance improvements, such as infrared absorption. Polymer films differ from polymer layers or interlayers in that the films alone do not provide the necessary penetration resistance and glass retention properties. The polymer film is generally thinner than the sheet and may generally have a thickness in the range of from 0.001 to 0.25 mm, although other thicknesses may be used. Poly(ethylene terephthalate) ("PET") is one example of a material used to form the polymer film. Examples of suitable bilayer constructs include: (glass)//(interlayer)//(film) and (glass)//(interlayer)//(coated film). Examples of other constructs that are not bilayers where a polymer film may be used include: (glass)//(interlayer)//(film)//(interlayer)//(glass) and (glass)//(interlayer)//(film)//(multiple layer interlayer)//(glass) where the polymer film may have coatings or any other functional layer(s), as previously described.

In embodiments, the layers and interlayers will be utilized in multiple layer panels comprising two substrates, such as, for example, a pair of glass sheets, with the interlayers disposed between the two substrates. Any suitable type of glass may be used to form the rigid glass substrate, such as alumina-silicate glass, borosilicate glass, quartz or fused silica glass, and soda lime glass. The glass substrate may be annealed, thermally-strengthened or tempered, chemically-tempered, etched, coated, or strengthened by ion exchange, or it may have been subjected to one or more of these treatments. The glass itself may be rolled glass, float glass, or plate glass. The glass may have a coating(s) such as a metal coating, infrared reflective coating, and the like, or it may just be colored or pigmented glass. An example of such a construct would be: (glass)//(interlayer)//(glass), where the interlayer can include a monolithic or multiple layered interlayer as described herein. As previously described, the construct may also include one or more polymer films if desired, and each interlayer may be a monolithic or multiple layer interlayer as desired. The thicknesses of the substrates can be in the range of from 0.5 mm to 15 mm or more and each panel can have the same thickness, or the panels can have different thicknesses.

The typical glass lamination process comprises the following steps: (1) assembly of the two substrates and the interlayer(s); (2) heating the assembly via an IR radiant or convective device for a first, short period of time; (3) passing the assembly into a pressure nip roll for the first de-airing; (4) heating the assembly for a short period of time (such as to about 60° C. to about 120° C.) to give the assembly enough temporary adhesion to seal the edge of the interlayer; (5) passing the assembly into a second pressure nip roll to further seal the edge of the interlayer and allow further handling; and (6) autoclaving the assembly at an appropriate temperature (such as between 135° C. and 150° C.) and pressure (such as between 150 psig and 200 psig) for an appropriate time (such as about 30 to 90 minutes), depending on the actual construct and materials used. Other methods for de-airing the interlayer-glass interface, as described according to one embodiment in steps (2) through (5) above include vacuum bag and vacuum ring processes, and both may also be used to form interlayers of the present invention as described herein.

The panels can be used for a variety of end use applications, including, for example, for automotive, railroad, marine, or aircraft windshields and windows, structural architectural panels in buildings or stadiums, decorative architectural panels, hurricane glass, bulletproof glass, and other similar applications. Examples of suitable architectural applications for panels according to embodiments of the present invention can include, but are not limited to, indoor or outdoor stairs or platforms, pavement or sidewalk skylights, balustrades, curtain walls, flooring, balconies, single side balconies, canopies, support beams, glass fins (that may be decorative and/or support structures), support columns, windows, doors, skylights, privacy screens, shower doors, windows for high rise buildings and building entrances, windshields for transportation applications (e.g., automotive, buses, jets, armored vehicles), bullet proof or resistant glass, security glass (e.g., for banks), hurricane proof or resistant glass, airplane canopies, mirrors, solar glass panels, flat panel displays, and blast resistant windows. The glass laminate can be visually clear, translucent, frosted, etched, or patterned.

In one embodiment, the interlayer is a monolithic interlayer comprising a polyesteramide layer comprising a polyesteramide or polyesteramide composition disclosed herein. In one embodiment, the interlayer is a multilayer interlayer comprising at least polyesteramide layer comprising a polyesteramide or polyesteramide composition disclosed herein. In one embodiment, the interlayer is a multilayer interlayer comprising more than one polyesteramide layer comprising a polyesteramide or polyesteramide composition disclosed herein. Other polymer layers, adhesive layers, tie layers, coatings and the like may be included in the interlayer as previously described.

In embodiments, the multilayer interlayer further comprises at least one non-polyesteramide layer. In embodiments, an adhesive coating may be used, wherein the adhesive coating is at least partially interposed between the non-polyesteramide layer and the polyesteramide layer. In embodiments, a tie layer (such as EVA or TPU) may be used between layers or partially disposed between layers of the multilayer interlayer. In embodiments, a multilayer panel comprises the layer or interlayer, optionally with other layers or interlayers.

The process for the preparation of the polyesteramide is known in the art. An example process includes: (1) reacting a reaction mixture comprising: (i) at least one diol (such as 5 to 25 mole %); and (ii) at least one diacid (such as 50 to 75 mole %) in a reaction zone at a first temperature, at a first pressure, and for a first time sufficient to provide at least one reaction product comprising 1 to 2 residues derived from the at least one diacid and 1 residue of the at least one diol; (2) adding at least one diamine (such as 5 to 25 mole %) and optionally water (such as up to 25 mole %) to the reaction zone comprising the at least one reaction product; and (3) reacting the diamine(s) with the at least one reaction product at a second temperature, at a second pressure, and for a second time sufficient to provide the polyesteramide; wherein the mole % of the diol, diacid, or diamine is based on the total moles of the diol, diacid and diamine, and wherein the mole % of the water is based on the total moles of the diacid and water. Other amounts may be used as desired for select properties.

Reaction times are dependent upon the selected temperatures, pressures, and feed mole ratios of the at least one diol, the at least one diamine, and the at least one diacid.

Catalysts can be used to catalyze the reaction(s). Examples of catalysts that can be used are based on titanium, tin, gallium, zinc, antimony, cobalt, manganese, germanium, alkali metals, particularly lithium and sodium, alkaline earth compounds, aluminum compounds, combinations of aluminum compounds with lithium hydroxide or sodium hydroxide. In one class of this embodiment, the catalyst is present from 1 to 500 ppm. In one subclass of this class, the catalyst is a tin catalyst. In one subclass of this class, the catalyst is a titanium catalyst.

The following examples are given to illustrate the invention and to enable any person skilled in the art to make and use the invention. It should be understood, however, that the invention is not to be limited to the specific conditions or details described in these examples. The patentable scope of the invention is defined by the claims, and may include other examples that occur to those skilled in the art.

EXAMPLES

Abbreviations

AD is adipic acid; AZ is azelaic acid; 1,4-BDO is 1,4-butanediol; DDA is 1,12-dodecanedioic acid; 1,4-CHDA: 1,4-cyclohexanedicarboxylic acid; 1,3-CHDA: 1,3-cyclohexanedicarboxylic acid; ECTMS is trimethoxy[2-(7-oxabicyclo[4.1.0]hept-3-yl)ethyl]silane; GPTMS is (3-glycidyloxypropyl)trimethoxysilane; H2-dimer is hydrogenated dimer acid (Pripol 1009, Registry No. 127290-22-6); MACM: 4,4'-methylenebis(2-methylcyclohexylamine), mixture of isomers; MDEA is N-methyl diethanolamine; ODA is 1,18-octadecanoic acid; PACM: 4,4'-methylenebis(cyclohexylamine), mixture of isomers; PTMG is polytetrahydrofuran diol; SE is sebacic acid; T928 is Tinuvin 928 (2-(2H-benzotriaol-2-yl)-6-(1-methyl-1-phenylethyl)-4-(1,1,3,3-tetramethylbutyl)phenol; TCDA is 3(4).8(9)-bis(aminomethyl)tricyclo[5.2.1.0$^{2.6}$]decane; TMCA: 5-amino-1,3,3-trimethylcyclohexanemethylamine; TMP is trimethylolpropane; CHDMA: 1,4-bis(aminomethyl)cyclohexane; 1,3-CHDMA is 1,3-bis(aminomethyl)cyclohexane; TMCD: 2,2,4,4-tetramethyl-1,3-cyclobutanediol; CHDM: 1,4-cyclohexanedimethanol, MPMD is 2-methylpentamethyldiamine, min: minute(s); TMHD is a mixture of 2,4,4-trimethyl hexanediamine and 2,2,4-trimethyl hexanediamine.

Inherent Viscosity Measurement

The inherent viscosities (IV) of the particular polymer materials useful herein are determined according to ASTM D2857-70 procedure, in a Wagner Viscometer of Lab Glass, Inc., having ½ mL capillary bulb, using a polymer concentration about 0.5% by weight in 60/40 by weight of phenol/tetrachloroethane. The procedure is carried out by heating the polymer/solvent system at 120° C. for 15 minutes, cooling the solution to 25° C. and measuring the time of flow at 25° C. The IV is calculated from the equation:

$$\eta_{inh} = \frac{\ln\frac{t_s}{t_0}}{C}$$

where: η: inherent viscosity at 25° C. at a polymer concentration of 0.5 g/100 mL of solvent; $t_s$: sample flow time; to: solvent-blank flow time; C: concentration of polymer in grams per 100 mL of solvent. The units of the inherent viscosity throughout this application are in the deciliters/gram.

In the following examples, a viscosity was measured in tetrachloroethane/phenol (50/50, weight ratio) at 30° C. and calculated in accordance with the following equation:

$$\eta_{inh} = \frac{\ln(\eta_{sp})}{C}$$

wherein $\eta_{sp}$ is a specific viscosity and C is a concentration.

Differential Scanning Calorimetry Thermal Analysis

The DSC experiments were carried out on a TA Instrument Q2000 DSC under nitrogen with a refrigerated cooling system. Temperature and heat of fusion of the instrument are routinely calibrated and verified with adamantane, lead and indium. Approximately samples were sealed in an aluminum pan. The sample pan was equilibrated at −50° C. before heated to 250° C. at a scanning rate of 20° C./min. The sample was then isothermally held at 250° C. for 1 min to remove its thermal history. Then the sample pan was cooled to −50° C. at a rate of 20° C./min, before it was reheated to 250° C. at the same scanning rate. Both the glass transition temperature and the melting peak were captured during the seconding heating scan.

Dynamic Mechanical Thermal Analysis (DMTA)

The glass transition temperatures of the polymer layers can be determined by dynamic mechanical thermal analysis (DMTA) according to the following procedure. A polymer sheet is molded into a sample disc of 8 millimeters (mm) in diameter. The polymer sample disc is placed between two parallel plate test fixtures of a Rheometrics Dynamic Spectrometer II. The polymer sample disc is tested in shear mode at an oscillation frequency of 1 Hertz as the temperature of the sample is increased from 20 to 100° C. at a rate of 3° C./minute. The position of the maximum value of tan delta (damping) plotted as dependent on temperature is used to determine the glass transition temperature. Experience indicates that the method is reproducible to within +/−1° C.

Example 1 (Method 1)

A mixture of adipic acid (43.84 g, 0.30 mole, 10 eq.), 2,2,4,4-tetramethylcyclobutanediol (9.08 g, 0.06 mole, 2 eq.) and titanium tetraisopropoxide solution (0.1 M in isopropanol, 2.6 mL, 0.26 mmol) was melted at 250° C. under a dry nitrogen stream. The temperature was gradually raised to 275° C. and held at 275° C. for 30 min. At that point, 4,4'-methylenebis(2-methylcyclohexylamine) (57.22 g, 0.24 mol, 8 eq.) and water (30 mL) were added. The temperature was gradually raised to 300° C. The temperature being raised as necessary to maintain the reaction mixture molten. The system was then subjected to high vacuum (0.1 torr) to remove the volatiles. The melt was then polymerized by heating at 300° C. for 90 min to give Example 1.

Example 2: (Method 2)

A mixture of 1,12-dodecandioic acid (69.09 g, 0.3 mole, 10 eq.), 2,2,4,4-tetramethylcyclobutanediol (29.85 g, 0.207 mole, 6.9 eq.), 4,4'-methylenebis(2-methylcyclohexylamine) (14.30 g, 0.06 mol, 2.0 eq), 4,4'-methylenebiscyclohexylamine (16.41 g, 0.078 mol, 2.6 eq) and butyltin tris-2-ethylhexanoate (1.7 wt. % in butanol, 1.26 mL, 200 ppm) were placed in a 500-mL flask equipped with an inlet for nitrogen, a metal stirrer and a short distillation column. The flask was immersed in a 200° C. molten metal bath under a dry nitrogen stream. After 1 minute, the bath temperature was gradually increased to 250° C. over 60 minutes and 275° C. over 60 minutes. After being held at 275° C. for 30 minutes, the mixture was gradually subjected to vacuum over the next 15 minutes to a set point of 0.5 torr. The melt was held at 275° C. at the set point of 0.5 torr for 130 minutes to give Example 2.

Example 3 (Method 3)

A mixture of adipic acid (146.15 g, 1.0 mole, 10 eq.), 1,4-cyclohexanedimethanol (102.40 g, 0.71 mole, 7.1 eq.), 4,4'-methylenebis(2-methylcyclohexylamine) (75.29 g, 0.31 mol, 3.1 eq) and water (20 mL) were placed in a 1-liter flask equipped with an inlet for nitrogen, a metal stirrer and a short distillation column. The flask was immersed in a 180° C. molten metal bath under a dry nitrogen stream. After 1 minute, the bath temperature was gradually increased to 210° C. over 10 minutes and held at 210° C. for 30 minutes. Titanium tetraisopropoxide solution (0.47 wt. % in isopropanol, 3.0 mL, 50 ppm) was added through a side port. The resulting mixture was heated to 250° C. over 30 minutes, then to 275° C. over 10 minutes, held at 275° C. for 40 minutes. Vacuum was gradually applied over the next 20 minutes to a set point of 0.5 torr. The melt was held at 275° C. at a set point of 0.5 torr for 270 minutes to give Example 3.

Example 4 (Method 4)

A mixture of 1,12-dodecandioic acid (80.61 g, 0.35 mole, 10 eq.), 1,4-cyclohexanedimethanol (29.28 g, 0.203 mole, 5.5 eq.), 4,4'-methylenebis(2-methylcyclohexylamine) (20.86 g, 0.088 mol, 2.5 eq), 4,4'-methylenebis-cyclohexylamine (14.73 g, 0.070 mol, 2.0 eq) and titanium tetraisopropoxide (0.944 wt. % in butanol, 0.4 mL, 30 ppm) were placed in a 500-mL flask equipped with an inlet for nitrogen, a metal stirrer and a short distillation column. The flask was immersed in a 200° C. molten metal bath under a dry nitrogen stream. After 1 minute, the bath temperature was gradually increased to 275° C. over 180 minutes. After being held at 275° C. for 30 minutes, the mixture was gradually subjected to vacuum over the next 15 minutes to a set point of 0.5 torr. The melt was hold at 275° C. at the set point of 0.5 torr for 260 minutes to give Example 4.

Example 5 (Method 5)

A mixture of 1,4-cyclohexanedicarboxylic acid (17.29 g, 0.1 mole, 10 eq.), 1,4-cyclohexanedimethanol (11.54 g, 0.08 mole, 8 eq.), 1,4-cyclohexanebis(methylamine) (4.27 g, 0.03 mol, 3 eq) and titanium tetraisopropoxide (0.1 M in isopropanol, 0.2 mL, $2.0 \times 10^3$ eq) were placed in a 250-mL flask equipped with an inlet for nitrogen, a metal stirrer and a short distillation column. The flask was immersed in a 250° C. molten metal bath under a dry nitrogen stream. After 20 min, the bath temperature was gradually increased to 280° C. over 30 min. After being held at 280° C. for 1 min, bath temperature was further increased to 305° C. over 10 min and held for 0.5 min. The mixture was gradually subjected to vacuum over the next 15 minutes to a set point of 0.5 mmHg. The melt was held at 305° C. at 0.5 mmHg for 89.5 min to give Example 5.

Polyesteramides listed in Table 1 comprise TMCD and were prepared based on one of Methods 1 to 5 as shown in Table 1.

TABLE 1

TMCD Based Polyesteramides

| Ex # | Meth | Acid 1 (mol) | Acid 2 (mol) | Acid 3 (mol) | Diol 1 (mol) | Diol 2 (mol) | Diamine 1 (mol) | Diamine 2 (mol) |
|---|---|---|---|---|---|---|---|---|
| 6 | 1 | DDA (0.3) | | | TMCD (0.18) | | PACM (0.12) | |
| 7 | 2 | DDA (0.3) | | | TMCD (0.15) | | PACM (0.09) | MACM (0.09) |
| 8 | 2 | DDA (0.3) | | | TMCD (0.15) | | PACM (0.09) | MACM (0.09) |
| 9 | 2 | DDA (0.3) | | | TMCD (0.198) | | PACM (0.06) | MACM (0.06) |
| 10 | 3 | DDA (0.3) | | | TMCD (0.11) | CHDM (0.09) | PACM (0.06) | MACM (0.06) |
| 11 | 3 | DDA (0.35) | | | TMCD (0.16) | CHDM (0.07) | PACM (0.07) | MACM (0.07) |
| 12 | 1 | DDA (0.3) | | | TMCD (0.06) | | PACM (0.24) | |
| 13 | 2 | DDA (0.3) | | | TMCD (0.08) | | PACM (0.12) | MACM (0.12) |
| 14 | 3 | DDA (0.35) | | | TMCD (0.09) | CHDM (0.14) | PACM (0.07) | MACM (0.07) |
| 15 | 2 | DDA (0.24) | AD (0.06) | | TMCD (0.14) | | PACM (0.09) | MACM (0.09) |
| 16 | 1 | DDA (0.24) | 1,3-CHDA (0.06) | | TMCD (0.18) | | PACM (0.12) | |
| 17 | 2 | DDA (0.24) | 1,3-CHDA (0.06) | | TMCD (0.2) | | PACM (0.06) | MACM (0.06) |
| 18 | 2 | DDA (0.24) | 1,3-CHDA (0.06) | | TMCD (0.15) | | PACM (0.09) | MACM (0.09) |
| 19 | 1 | DDA (0.18) | 1,3-CHDA (0.12) | | TMCD (0.18) | | PACM (0.12) | |
| 20 | 1 | DDA (0.24) | 1,3-CHDA (0.06) | | TMCD (0.06) | | PACM (0.24) | |
| 21 | 2 | DDA (0.18) | AD (0.12) | | TMCD (0.14) | | PACM (0.09) | MACM (0.09) |
| 22 | 3 | DDA (0.48) | 1,3-CHDA (0.32) | | TMCD (0.29) | | MPMD (0.56) | |

TABLE 1-continued

TMCD Based Polyesteramides

| Ex # | Meth | Acid 1 (mol) | Acid 2 (mol) | Acid 3 (mol) | Diol 1 (mol) | Diol 2 (mol) | Diamine 1 (mol) | Diamine 2 (mol) |
|---|---|---|---|---|---|---|---|---|
| 23 | 1 | DDA (0.18) | 1,3-CHDA (0.12) | | TMCD (0.06) | | TMCA (0.24) | |
| 24 | 1 | DDA (0.18) | 1,3-CHDA (0.12) | | TMCD (0.06) | | CHDMA (0.24) | |
| 25 | 1 | DDA (0.18) | 1,3-CHDA (0.12) | | TMCD (0.06) | | MACM (0.24) | |
| 26 | 3 | DDA (0.22) | 1,3-CHDA (0.14) | | TMCD (0.08) | | MACM (0.29) | |
| 27 | 1 | DDA (0.12) | 1,3-CHDA (0.18) | | TMCD (0.12) | | MACM (0.18) | |
| 28 | 2 | DDA (0.1) | 1,3-CHDM (0.1) | AD (0.1) | TMCD (0.18) | | MACM (0.15) | |
| 29 | 1 | DDA (0.09) | 1,3-CHDA (0.21) | | TMCD (0.11) | | MACM (0.21) | |
| 30 | 1 | DDA (0.09) | 1,3-CHDA (0.21) | | TMCD (0.14) | | MACM (0.18) | |
| 31 | 1 | DDA (0.06) | 1,3-CHDA (0.24) | | TMCD (0.12) | | MACM (0.18) | |
| 32 | 1 | AD (0.3) | | | TMCD (0.183) | | MACM (0.12) | |
| 33 | 1 | AD (0.24) | 1,3-CHDA (0.06) | | TMCD (0.18) | | MACM (0.12) | |
| 34 | 1 | AD (0.24) | 1,3-CHDA (0.06) | | TMCD (0.12) | | MACM (0.18) | |
| 35 | 1 | AD (0.24) | 1,3-CHDA (0.06) | | TMCD (0.06) | | MACM (0.24) | |
| 36 | 1 | AD (0.24) | 1,3-CHDA (0.06) | | TMCD (0.06) | | MACM (0.24) | |
| 37 | 1 | AD (0.18) | 1,3-CHDA (0.12) | | TMCD (0.18) | | MACM (0.12) | |
| 38 | 1 | AD (0.18) | 1,3-CHDA (0.12) | | TMCD (0.12) | | MACM (0.18) | |
| 39 | 1 | AD (0.18) | 1,3-CHDA (0.12) | | TMCD (0.06) | | MACM (0.24) | |
| 40 | 1 | AD (0.12) | 1,3-CHDA (0.18) | | TMCD (0.12) | | MACM (0.18) | |
| 66 | 1 | DDA (0.18) | 1,3-CHDA (0.12) | | TMCD (0.11) | | MACM (0.24) | |
| 67 | 3 | DDA (0.18) | 1,3-CHDA (0.12) | | TMCD (0.11) | | MACM (0.24) | |
| 68 | 3 | DDA (0.15) | 1,3-CHDA (0.10) | | TMCD (0.063 mol) | CHDM (0.025 mol) | MACM (0.20 mol) | |
| 69 | 3 | DDA (0.15) | 1,3-CHDA (0.10) | | TMCD (0.063 mol) | CHDM (0.025 mol) | MACM (0.20 mol) | |
| 70 | 3 | DDA (0.15) | 1,3-CHDA (0.10) | | TMCD (0.09) | | MACM (0.20) | |
| 71 | 3 | DDA (0.15) | 1,3-CHDA (0.10) | | TMCD (0.09) | | MACM (0.20) | |
| 72 | 3 | DDA (0.15) | 1,3-CHDA (0.10) | | TMCD (0.05) | CHDM (0.038) | MACM (0.20) | |

Polyesteramides listed in Table 2 comprise CHDM and were prepared based on one of Methods 1 to 5 as shown in Table 2.

TABLE 2

CHDM Based Polyesteramides.

| Ex # | Meth | Acid 1 (mol) | Acid 2 (mol) | Diol 1 (mol) | Diol 2 (mol) | Diamine 1 (mol) | Diamine 2 (mol) |
|---|---|---|---|---|---|---|---|
| 41 | 3 | DDA (0.6) | | CHDM (0.37) | | MACM (0.24) | |
| 42 | 3 | DDA (0.45) | | CHDM (0.28) | | PACM (0.18) | |
| 43 | 1 | DDA (0.3) | | CHDM (0.2) | | MACM (0.06) | PACM (0.06) |
| 44 | 4 | DDA (0.3) | | CHDM (0.18) | | MACM (0.127) | |
| 45 | 3 | DDA (0.6) | | CHDM (0.34) | | MACM (0.27) | |
| 46 | 4 | DDA (0.3) | | CHDM (0.17) | | MACM (0.12) | PACM (0.02) |
| 47 | 4 | DDA (0.3) | | CHDM (0.17) | | MACM (0.10) | PACM (0.03) |
| 48 | 4 | DDA (0.3) | | CHDM (0.17) | | MACM (0.09) | PACM (0.04) |
| 49 | 4 | DDA (0.30) | | CHDM (0.16) | | MACM (0.14) | |
| 50 | 3 | DDA (0.3) | | CHDM (0.16) | | PACM (0.15) | |
| 51 | 1 | DDA (0.18) | 1,3-CHDA (0.12) | CHDM (0.07) | | MACM (0.24) | |
| 52 | 3 | AD (0.45) | | CHDM (0.41) | | PACM (0.05) | |
| 53 | 3 | AD (0.45) | | CHDM (0.40) | | PACM (0.06) | |
| 54 | 3 | AD (0.45) | | CHDM (0.39) | | PACM (0.07) | |
| 55 | 4 | AD (0.3) | | CHDM (0.25) | | PACM (0.06) | |
| 56 | 3 | AD (1.0) | | CHDM (0.71) | | PACM (0.15) | MACM (0.16) |
| 57 | 3 | AD (1.0) | | CHDM (0.67) | | PACM (0.15) | MACM (0.18) |
| 58 | 3 | AD (1.0) | | CHDM (0.67) | | MACM (0.33) | |
| 59 | 3 | AD (0.45) | | CHDM (0.3) | | PACM (0.08) | MACM (0.08) |
| 60 | 3 | AD (1.0) | | CHDM (0.65) | | MACM (0.35) | |
| 61 | 3 | AD (1.0) | | CHDM (0.65) | | PACM (0.15) | MACM (0.20) |
| 62 | 3 | AD (0.45) | | CHDM (0.28) | | MACM (0.18) | |
| 63 | 3 | AD (0.45) | | CHDM (0.23) | | PACM (0.09) | MACM (0.14) |
| 64 | 3 | AD (0.45) | | CHDM (0.23) | | MACM (0.23) | |
| 65 | 3 | AD (0.45) | | CHDM (0.19) | | MACM (0.27) | |
| 76 | | SE (0.18) | 1,3-CHDA (0.12) | CHDM (0.13) | | MACM (0.18) | |
| 79 | 3 | DDA (0.40) | AD (0.40) | CHDM (0.51) | | MACM (0.30) | |
| 80 | 3 | DDA (0.25) | AD (0.25) | CHDM (0.33) | | MACM (0.18) | |
| 81 | 3 | DDA (0.334) | AD (0.167) | CHDM (0.318) | | MACM (0.193) | |
| 82 | 3 | DDA (0.334) | AD (0.167) | CHDM (0.313) | | MACM (0.198) | |
| 83 | 3 | DDA (0.334) | AD (0.167) | CHDM (0.308) | | MACM (0.203) | |
| 84 | 3 | DDA (0.4) | | CHDM (0.232) | | MACM (0.16) | PACM (0.02) |
| 85 | 3 | DDA (0.4) | | CHDM (0.232) | | MACM (0.14) | PACM (0.04) |
| 86 | 3 | DDA (0.4) | | CHDM (0.232) | | MACM 0.12) | PACM (0.06) |

TABLE 2-continued

CHDM Based Polyesteramides.

| Ex # | Meth | Acid 1 (mol) | Acid 2 (mol) | Diol 1 (mol) | Diol 2 (mol) | Diamine 1 (mol) | Diamine 2 (mol) |
|---|---|---|---|---|---|---|---|
| 87 | 3 | DDA (0.4) | | CHDM (0.232) | | MACM (0.10) | PACM (0.08) |
| 88 | 3 | SE (0.5) | | CHDM (0.34) | | MACM (0.17) | |
| 89 | 3 | SE (0.5) | | CHDM (0.33) | | MACM (0.17) | |
| 90 | 3 | DDA (0.5) | | CHDM (0.26) | | MACM (0.25) | |
| 91 | 3 | DDA (0.5) | | CHDM (0.16) | | 1,3-CHDMA (0.36) | |
| 92 | 3 | DDA (0.3) | 1,3-CHDA (0.20) | CHDM (0.31) | | 1,3-CHDMA (0.20) | |
| 93 | 3 | DDA (0.18) | Cis-1,3-CHDA (0.12) | CHDM (0.07) | | MACM (0.24) | |
| 94 | 3 | DDA (0.375) | 1,3-CHDA (0.125) | CHDM (0.39) | | MACM (0.13) | |
| 95 | 3 | DDA (0.45) | 1,4-CHDA (0.05) | CHDM (0.31) | | MACM (0.20) | |
| 96 | 3 | H2-dimer acid (0.2) | | CHDM (0.01) | | MACM (0.19) | |
| 97 | 3 | H2-dimer acid (0.2) | | CHDM (0.03) | | MACM (0.17) | |
| 100 | 3 | DDA (0.50) | | CHDM (0.31) | | PACM (0.20) | |
| 101 | 3 | DDA (0.50) | | CHDM (0.29) | | PACM (0.23) | |
| 102 | 3 | DDA (0.50) | | CHDM (0.26) | | PACM (0.25) | |
| 103 | 3 | DDA (0.5) | | CHDM (0.2) | | MACM (0.24) | |
| 104 | 3 | DDA (0.50) | | CHDM (0.20) | 1,4-BDO (0.08) | PACM (0.25) | |
| 105 | 3 | DDA (0.50) | | CHDM (0.13) | 1,4-BDO (0.15) | PACM (0.25) | |
| 106 | 3 | DDA (0.50) | | CHDM (0.05) | 1,4-BDO (0.23) | PACM (0.25) | |
| 107 | 3 | DDA (0.450) | | CHDM (0.11) | 1,4-BDO (0.16) | PACM (0.23) | |
| 108 | 3 | DDA (0.55) | | CHDM (0.06) | 1,4-BDO (0.45) | PACM (0.14) | MACM (0.14) |
| 109 | 3 | DDA (0.45) | | CHDM (0.26) | | PACM (0.09) | MACM (0.11) |
| 110 | 3 | DDA (0.46) | | CHDM (0.22) | PTMG (0.04) | PACM (0.12) | MACM (0.09) |
| 111 | 4 | DDA (0.25) | | CHDM (0.13) | | MACM (0.125) | |
| 112 | 4 | DDA (0.25) | | CHDM (0.105) | | MACM (0.15) | |
| 182 | 3 | DDA (0.2) | | CHDM (0.1) | PTMG2 (0.02) | MACM (0.09) | |

Table 3 provides polyesteramides with TMP incorporated as a branching agent.

TABLE 3

Polyesteramides with TMP branching agent.

| Ex # | Meth | Acid 1 (mol) | Acid 2 (mol) | Diol 1 (mol) | Diol 2 (mol) | Diamine 1 (mol) | Diamine 2 (mol) | Branching Agent (mol) |
|---|---|---|---|---|---|---|---|---|
| 113 | 1 | DDA (0.18) | 1,3-CHDA (0.12) | TMCD (0.08) | | MACM (0.24) | | TMP (0.0008) |
| 114 | 3 | DDA (0.46) | | CHDM (0.26) | | MACM (0.12) | PACM (0.09) | TMP (0.0012) |

TABLE 3-continued

Polyesteramides with TMP branching agent.

| Ex # | Meth | Acid 1 (mol) | Acid 2 (mol) | Diol 1 (mol) | Diol 2 (mol) | Diamine 1 (mol) | Diamine 2 (mol) | Branching Agent (mol) |
|---|---|---|---|---|---|---|---|---|
| 115 | 3 | SE (0.43) | ODA (0.05) | CHDM (0.28) | | MACM (0.21) | | TMP (0.0012) |
| 116 | 3 | SE (0.43) | ODA (0.05) | CHDM (0.28) | | MACM (0.06) | PACM (0.14) | TMP (0.0012) |
| 117 | 3 | SE (0.43) | ODA (0.05) | CHDM (0.27) | | MACM (0.22) | | TMP (0.0012) |
| 118 | 3 | SE (0.43) | ODA (0.05) | CHDM (0.28) | | MACM (0.13) | PACM (0.07) | TMP (0.0012) |
| 119 | 3 | SE (0.50) | | CHDM (0.29) | | MACM (0.22) | | TMP (0.0013) |
| 120 | 3 | SE (0.50) | | CHDM (0.29) | | MACM (0.22) | | TMP (0.0013) |
| 121 | 3 | SE (0.50) | | CHDM (0.28) | | MACM (0.23) | | TMP (0.0013) |
| 122 | 3 | SE (0.50) | | CHDM (0.29) | | MACM (0.19) | PACM (0.03) | TMP (0.0013) |
| 123 | 3 | DDA (0.50) | | CHDM (0.30) | | MACM (0.20) | | TMP (0.005) |
| 124 | 3 | DDA (0.50) | | CHDM (0.31) | | MACM (0.20) | | TMP (0.0025) |
| 125 | 3 | DDA (0.50) | | CHDM (0.31) | | MACM (0.20) | | TMP (0.0005) |
| 126 | 3 | DDA (0.90) | | CHDM (0.55) | | MACM (0.36) | | TMP (0.0023) |
| 127 | 3 | DDA (0.50) | | CHDM (0.31) | | MACM (0.20) | | TMP (0.0025) |
| 128 | 3 | DDA (0.5) | | CHDM (0.26) | | MACM (0.24) | | TMP (0.005) |
| 129 | 3 | DDA (0.5) | | CHDM (0.26) | | MACM (0.08) | PACM (0.18) | TMP (0.0025) |
| 130 | 3 | DDA (0.5) | | CHDM (0.27) | | MACM (0.24) | | TMP (0.0013) |
| 131 | 3 | DDA (0.45) | | CHDM (0.25) | | MACM (0.21) | | TMP (0.0011) |
| 132 | 3 | DDA (0.45) | | CHDM (0.25) | | MACM (0.21) | | TMP (0.0011) |
| 133 | 4 | DDA (0.40) | | CHDM (0.13) | | 1,3-CHDMA (0.28) | | TMP (0.001) |
| 134 | 3 | DDA (0.45) | 1,4-CHDA (0.05) | CHDM (0.28) | | MACM (0.23) | | TMP (0.0013) |
| 136 | 3 | DDA (0.45) | ODA (0.05) | CHDM (0.27) | | MACM (0.24) | | TMP (0.0013) |
| 137 | 3 | DDA (0.45) | H2-dimer acid (0.05) | CHDM (0.27) | | MACM (0.24) | | TMP (0.0013) |
| 138 | 3 | DDA (0.5) | | CHDM (0.18) | TMCD (0.17) | MACM (0.23) | | TMP (0.0013) |
| 139 | 3 | DDA (05) | | CHDM (0.22) | | MACM (0.24) | MDEA (0.05) | TMP (0.0013) |
| 140 | 3 | DDA (0.36) | ODA (0.04) | CHDM (0.22) | | MACM (0.19) | | TMP (0.0010) |
| 141 | 3 | DDA (0.36) | ODA (0.04) | CHDM (0.22) | | MACM (0.07) | PACM (0.12) | TMP (0.0010) |
| 142 | 3 | DDA (0.41) | H2-dimer acid (0.02) | CHDM (0.24) | | MACM (0.20) | | TMP (0.0011) |
| 143 | 3 | DDA (0.41) | H2-dimer acid (0.02) | CHDM (0.24) | | MACM (0.14) | PACM (0.06) | TMP (0.0011) |
| 144 | 3 | DDA (0.46) | | CHDM (0.26) | | PACM (0.09) | MACM (0.12) | TMP (0.0012) |
| 145 | 4 | SE (0.35) | | CHDM (0.21) | | MACM (0.15) | | TMP (0.0009) |
| 146 | 4 | DDA (0.35) | | CHDM ((0.19) | | MACM (0.15) | PACM (0.02) | TMP (0.0009) |
| 147 | 4 | DDA (0.35) | | CHDM (0.19) | | MACM (0.13) | PACM (0.04) | TMP (0.0009) |
| 148 | 4 | AZ (0.30) | | CHDM (0.18) | | PACM (0.13) | | TMP (0.008) |
| 149 | 4 | AZ (0.40) | | CHDM (0.24) | | MACM (0.17) | | TMP (0.001) |

TABLE 3-continued

Polyesteramides with TMP branching agent.

| Ex # | Meth | Acid 1 (mol) | Acid 2 (mol) | Diol 1 (mol) | Diol 2 (mol) | Diamine 1 (mol) | Diamine 2 (mol) | Branching Agent (mol) |
|---|---|---|---|---|---|---|---|---|
| 150 | 4 | DDA (0.40) | | CHDM (0.30) | | MACM (0.11) | | TMP (0.001) |
| 151 | 4 | DDA (0.40) | | CHDM (0.31) | | MACM (0.11) | | TMP (0.001) |
| 152 | 4 | DDA (0.04) | | CHDM (0.33) | | MACM (0.08) | | TMP (0.001) |
| 153 | 4 | DDA (0.20) | AZ (0.20) | CHDM (0.23) | | PACM (0.18) | | TMP (0.001) |
| 154 | 4 | SE (0.20) | AZ (0.20) | CHDM (0.23) | | PACM (0.18) | | TMP (0.001) |
| 155 | 4 | DDA (0.4) | | CHDM (0.21) | | TCDA (0.20) | | TMP (0.001) |
| 156 | 4 | DDA (0.4) | | CHDM (0.25) | | TCDA (0.16) | | TMP (0.001) |
| 157 | 4 | DDA (0.35) | | CHDM (0.182) | | MACM (0.175) | | TMP (0.001) |
| 158 | 4 | DDA (0.35) | | CHDM (0.181) | | MACM (0.175) | | TMP (0.002) |
| 159 | 4 | DDA (0.35) | | CHDM (0.17) | | MACM (0.19) | | TMP (0.0006) |
| 160 | 4 | DDA (0.35) | | CHDM (0.17) | | MACM (0.19) | | TMP (0.0012) |
| 161 | 4 | DDA (0.45) | | CHDM (0.25) | | MACM (0.21) | | TMP (0.003) |
| 162 | 4 | DDA (0.40) | | CHDM (0.25) | | MACM (0.148) | PACM (0.04) | TMP (0.001) |
| 163 | 4 | DDA (0.40) | | CHDM (0.33) | | MACM (0.06) | PACM (0.12) | TMP (0.001) |
| 164 | 4 | DDA (0.40) | | CHDM (0.218) | | MACM (0.188) | | TMP (0.004) |
| 165 | 4 | DDA (0.40) | | CHDM (0.215) | | MACM (0.188) | | TMP (0.006) |
| 166 | 4 | DDA (0.40) | | CHDM (0.212) | | MACM (0.188) | | TMP (0.008) |
| 167 | 4 | DDA (0.40) | | CHDM (0.214) | | MACM (0.188) | | TMP (0.001) |
| 183 | 4 | DDA (0.30) | AD (0.15) | CHDM (0.16) | | MACM (0.15) | TMHD (0.15) | TMP (0.0008) |

Example 168 (Method 6)

A mixture of 1,12-dodecandioic acid (92.12 g, 0.40 mole, 10 eq.), 1,4-cyclohexanedimethanol (32.30 g, 0.22 mole, 5.6 eq.), 4,4'-methylenebis(2-methylcyclohexylamine) (44.82 g, 0.19 mol, 4.7 eq) and titanium tetraisopropoxide (0.64 wt. % in butanol, 1.19 g, 50 ppm) were placed in a 500-mL flask equipped with an inlet for nitrogen, a metal stirrer and a short distillation column. The flask was immersed in a 200° C. molten metal bath under a dry nitrogen stream. After 1 minute, the bath temperature was gradually increased to 290° C. over 180 minutes. After reaching 290° 0, triethoxy[2-(7-oxabicyclo[4.1.0]hept-3-yl)ethyl]silane (10 wt. % in Toluene, 2.46 g, 0.25%) was added through a side port. After being held at 290° C. for 30 minutes, the mixture was gradually subjected to vacuum over the next 15 minutes to a set point of 0.5 torr. The melt was held at 290° C. at the set point of 0.5 torr for 260 minutes to give Example 168.

Table 4 provides polyesteramides with an epoxy silane added to improve glass adhesion.

TABLE 4

Polyesteramides with silane to improve glass adhesion.

| Ex # | Meth | Acid 1 (mol) | Diol 1 (mol) | Diamine 1 (mol) | TMP | Epoxy Silane (mol) |
|---|---|---|---|---|---|---|
| 169 | 4 | DDA (0.4) | CHDM (0.22) | MACM (0.19) | | GPTMS (0.0005) |
| 170 | 6 | DDA (0.4) | CHDM (0.22) | MACM (0.19) | | GPTMS (0.0005) |
| 171 | 3 | DDA (0.45) | CHDM (0.25) | MACM (0.21) | | ECTMS (0.0011) |
| 172 | 4 | DDA (0.45) | CHDM (0.25) | MACM (0.21) | | ECTMS (0.0011) Added after releasing the vacuum |
| 173 | 4 | DDA (0.30) | CHDM (0.17) | MACM (0.14) | | ECTMS (0.0008) Added after releasing the vacuum |

TABLE 4-continued

Polyesteramides with silane to improve glass adhesion.

| Ex # | Meth | Acid 1 (mol) | Diol 1 (mol) | Diamine 1 (mol) | TMP | Epoxy Silane (mol) |
|---|---|---|---|---|---|---|
| 174 | 4 | DDA (0.30) | CHDM (0.16) | MACM (0.14) | TMP (0.0008) | ECTMS (0.0008) Added after releasing the vacuum |
| 175 | 4 | DDA (0.30) | CHDM (0.16) | MACM (0.14) | TMP (0.0008) | ECTMS (0.0008) Added after releasing the vacuum |
| 176 | 4 | DDA (0.30) | CHDM (0.16) | MACM (0.14) | TMP (0.0008) | ECTMS (0.0008) Added after releasing the vacuum |
| 177 | 4 | DDA (0.35) | CHDM (0.19) | MACM (0.16) | TMP (0.0008) | ECTMS (0.0004) |
| 178 | 6 | DDA (0.4) | CHDM (0.22) | MACM (0.19) | TMP (0.001) | ECTMS (0.0005) |

Table 5 provides polyesteramides with a UV absorber added.

TABLE 5

Polyesteramides with UV absorber.

| Ex # | Meth | Acid 1 (mol) | Diol 1 (mol) | Diamine 1 (mol) | TMP | UV Abs. |
|---|---|---|---|---|---|---|
| 179 | 3 | DDA (0.45) | CHDM (0.25) | MACM (0.21) | TMP (0.0011) | T928 (0.35%) |
| 180 | 3 | DDA (0.45) | CHDM (0.25) | MACM (0.21) | TMP (0.0011) | T928 (0.20%) |
| 181 | 3 | DDA (0.45) | CHDM (0.25) | MACM (0.21) | TMP (0.0011) | T928 (0.10%) |

Table 6 provides the inherent viscosity and glass transition temperature for some of the TMCD comprising polyesteramides.

TABLE 6

| Ex # | Ih.V. dL/g | 2nd heat $T_g$ (° C.) [$T_m$ (° C.)] |
|---|---|---|
| 1 | 0.76 | 167 |
| 2 | 1.08 | 66 |
| 6 | 0.65 | 16 |
| 7 | 1.18 | 102 |
| 8 | 0.99 | 99 |
| 9 | 1.10 | 59 |
| 10 | 0.84 | 57 |
| 11 | 0.92 | 48 |
| 12 | 0.76 | 99.3 [141.4] |
| 13 | 1.14 | 133 |
| 14 | 0.85 | 39 |
| 15 | 0.68 | 102 |
| 16 | 0.57 | 32 |
| 17 | 0.49 | 73 |
| 18 | 0.56 | 112 |
| 19 | 0.71 | 84 [223] |
| 20 | 0.75 | 123 [187, 222] |
| 21 | 0.60 | 108 |
| 22 | 0.50 | 51 |
| 23 | 0.26 | 80 |
| 24 | 0.33 | 129 |
| 25 | 0.72 | 157 |
| 26 | 0.65 | — |
| 27 | 0.65 | 153.4 |
| 28 | 0.45 | 125 |
| 29 | 0.65 | 178.7 |
| 30 | 0.58 | 163.2 |
| 31 | 0.60 | 179.5 |
| 32 | 0.61 | 98.8 |
| 33 | 0.61 | 117.6 |
| 34 | 0.72 | 153.6 |
| 35 | 0.68 | 179 |
| 36 | 0.69 | 179.3 |
| 37 | 0.62 | 130.7 |
| 38 | 0.62 | 164.7 |
| 39 | 0.52 | 188.1 |
| 40 | 0.59 | 180.9 |
| 42 | 0.35 | 23.9 [228.3] |
| 66 | 0.44 | 152.6 |
| 67 | 0.737 | 152.5 |
| 68 | 0.649 | 153.3 |
| 69 | 0.623 | 151.8 |
| 70 | 0.592 | 157 |
| 71 | 0.585 | 156.1 |
| 72 | 0.846 | 156.8 |

Table 7 provides the inherent viscosity and glass transition temperature for CHDM comprising polyesteramides.

TABLE 7

| Ex # | Ih.V. (dL/g) | 2nd heat $T_g$ (° C.) [$T_m$ (° C.)] |
|---|---|---|
| 3 | 0.93 | 35 |
| 4 | 1.08 | 50 |
| 5 | 0.78 | 98 |
| 41 | 1.08 | 21.1 |
| 42 | 0.35 | — |
| 43 | 0.70 | 41.5 |
| 44 | 1.03 | 48 |
| 45 | 1.05 | 53.8 |
| 46 | 0.90 | 47 |
| 47 | 1.08 | 49 |
| 48 | 1.14 | 50 |
| 49 | 1.18 | 90 |
| 50 | 0.42 | 19 [201] |
| 51 | 0.90 | 151 |
| 52 | 0.99 | −13.2 |
| 53 | 1.02 | −9.1 |
| 54 | 0.83 | −9.3 |
| 55 | 1.18 | 90 |
| 56 | 0.63 | 32 |
| 57 | 0.58 | 50 |
| 58 | 1.02 | 54 |
| 59 | 0.98 | 53 |
| 60 | 0.97 | 52 |
| 61 | 1.01 | 48 |
| 62 | 0.88 | 69.3 |
| 63 | 0.92 | 80.9 |
| 64 | 1.07 | 99 |
| 65 | 0.84 | 121.1 |

TABLE 7-continued

| Ex # | Ih.V. (dL/g) | 2nd heat $T_g$ (° C.) [$T_m$ (° C.)] |
|---|---|---|
| 76 | 0.748 | 118 |
| 79 | 0.992 | 41 |
| 80 | 1.071 | 54 |
| 81 | 0.982 | 51 |
| 82 | 0.988 | 56 |
| 83 | 0.887 | 50 |
| 84 | 0.909 | 49.66 |
| 85 | 0.996 | 47.5 [127, 172] |
| 86 | 1.073 | 47.1 [134, 168] |
| 87 | 1.027 | 45.6 [115.5, 166.6] |
| 88 | 0.919 | 40.3 |
| 89 | 0.991 | 45.2 |
| 90 | 0.898 | 60.2 |
| 91 | 0.864 | 48.2 |
| 92 | 0.759 | 32.5 |
| 93 | 0.709 | 152 |
| 94 | 0.339 | −16.4 |
| 95 | 0.267 | −14.7 |
| 96 | 0.664 | 70.7 |
| 97 | 0.628 | 58.6 |
| 100 | 1.02 | 3.29 |
| 101 | 1.13 | 17.8 |
| 102 | 0.996 | 26.4 |
| 103 | 0.835 | 46.5 |
| 104 | 1.035 | 52.9 [212] |
| 105 | 0.446 | 39.2 [221] |
| 106 | 0.885 | 43.2 [216] |
| 107 | 1.023 | 40 [216] |
| 108 | 0.711 | 45.2 [154, 189] |
| 109 | 0.997 | 49.7 |
| 110 | 0.873 | 45 [175] |
| 111 | 1.109 | 63 |
| 112 | 1.082 | 83 |
| 183 | 0.89 | 43.0 |

Table 8 provides the properties for polyesteramides including TMP.

TABLE 8

| Ex # | Ih.V. (dL/g) | 2$^{nd}$ heat Tg(° C.) [Tm(° C.)] |
|---|---|---|
| 113 | 0.588 | 153.2 |
| 114 | 1.012 | 48.1 [138, 171] |
| 115 | 1.101 | 49.8 |
| 116 | 1.161 | 45.9 |
| 117 | 0.928 | 55.8 |
| 118 | 0.941 | 46.6 [126, 169] |
| 119 | 1.188 | 55.6 |
| 120 | 1.203 | 55.8 |
| 121 | 1.133 | 59.9 |
| 122 | 1.169 | 58.0 |
| 123 | 1.098 | 42.8 |
| 124 | 1.105 | 41.1 |
| 125 | 0.927 | 45.9 |
| 126 | 1.034 | 47.4 |
| 127 | 1.128 | 47.8 |
| 128 | 1.118 | 64.3 |
| 129 | 1.157 | 54.3 [180] |
| 130 | 1.112 | 54.3 |
| 131 | 0.965 | 52.8 |
| 132 | 1.071 | 55.6 |
| 133 | 1.205 | 36.1 |
| 134 | 1.155 | 60 |
| 136 | 1.042 | 55.3 |
| 137 | 1.037 | 43.6 |
| 138 | 0.762 | 56.8 |
| 139 | 0.846 | 53.1 |
| 140 | 1.062 | 50 |
| 141 | 1.059 | 49.2 |
| 142 | 1.096 | 46.2 |
| 143 | 1.056 | 54.1 |
| 144 | 1.068 | 40 [170] |
| 145 | 1.079 | 51.5 |

TABLE 8-continued

| Ex # | Ih.V. (dL/g) | 2$^{nd}$ heat Tg(° C.) [Tm(° C.)] |
|---|---|---|
| 146 | 1.123 | 48.4 |
| 147 | 1.167 | 52 |
| 148 | 1.207 | 25.2 [74, 205] |
| 149 | 1.107 | −26.6 [73, 124] |
| 150 | 1.088 | — |
| 151 | 1.107 | −26.6 [73, 124] |
| 152 | 1.138 | −28.9 [114] |
| 153 | 1.171 | 41.2 [176, 203] |
| 154 | 1.108 | 456 [171] |
| 155 | 1.091 | 17.1 |
| 156 | 1.069 | 1.07 |
| 157 | 1.289 | 62.3 |
| 158 | 1.338 | 60.3 |
| 159 | 1.216 | 69.8 |
| 160 | 1.335 | 70.5 |
| 161 | 1.648 | 56.7 |
| 162 | 1.052 | 50.2 |
| 163 | 0.997 | 48.8 [140, 177] |
| 164 | 1.762 | 54.9 |
| 165 | 1.508 | 54.7 |
| 166 | Nd | 58.3 |
| 167 | 1.102 | 53.3 |
| 182 | 1.307 | 53.4 |

Table 9 provides the properties of the polyesteramides reacted with silanes.

TABLE 9

| Ex # | Ih.V. (dL/g) | 2$^{nd}$ heat Tg (° C.) [Tm(° C.)] |
|---|---|---|
| 168 | 0.875 | 48 |
| 169 | 1.294 | 52.8 |
| 170 | 1.096 | 48.4 |
| 171 | 0.74 | 52.9 |
| 172 | 0.384 | 53.9 |
| 173 | 0.819 | 50.6 |
| 174 | 0.993 | 48.1 |
| 175 | 0.981 | 47.5 |
| 176 | 0.950 | 47.3 |
| 177 | 1.245 | 54.6 |
| 178 | 1.277 | 55.3 |

Table 10 provides the properties of the polyesteramides that were blended with UV absorbers.

TABLE 10

| Ex # | Ih.V. (dL/g) | 2$^{nd}$ heat Tg (° C.) [Tm(° C.)] |
|---|---|---|
| 179 | 1.109 | 59.6 |
| 180 | 1.015 | 51.3 |
| 181 | 1.063 | 51.9 |

Table 11 provides the inherent viscosity and glass transition information for select comparative examples (commercially available materials).

TABLE 11

| Ex # | 2nd heat $T_g(T_m)$ |
|---|---|
| Eastman Tritan ™ Copolyester TX2001 | 116 |
| Eastman Tritan ™ Copolyester TX1001 | 108 |
| Zeon ZeonorFilm ZF14 | 136 |
| Konica TAC | 160-170 |
| TOYOBO PET | ~80 |

Interlayer Examples

Polyesteramide compositions produced in the same manner as above were used to produce interlayer sheets. The interlayer sheets were produced by pressing or compression molding the polyesteramide pellets of various compositions. To form a polyesteramide sheet, a non-stick film was placed on a stainless steel plate. A square aluminum shim of the desired thickness was placed on the film in the center of the steel plate. The polymer pellets were then placed on top of the non-stick film in the center of the aluminum shim, so that all pellets were in contact. A second non-stick film was placed on top of the pellets, and a second stainless steel plate was placed on top of the film.

Some of the polyesteramide interlayer sheets were then laminated between glass to form a laminate (or multiple layer glass panel) using techniques known in the art. To make a laminate, the sheet was cut to size of the desired glass laminate and placed between two pieces of glass of the same size to form a pre-laminate. The pre-laminate was then placed in a vacuum bag, and a vacuum was drawn (about −25 inches Hg at room temperature) for 10 to 20 minutes. Vacuum was maintained, and the bag was placed in a preheated oven until the bag reached a temperature sufficient to ensure polymer tacking to glass. The bag was then removed from the oven and the vacuum was released. The laminate was then autoclaved to dissolve any remaining trapped air present after vacuum bag (with a 20 minute hold at 290° F. and 185 psi).

The polyesteramide compositions used are described and shown below. The interlayers and laminates (glass panels) were tested for glass transition temperature (Tg, by DMTA), Shear Stress Modulus (at various temperatures), Break Height, YI (yellowness index or color), % Haze and in some cases adhesion (compressive shear adhesion). In some cases, the inherent viscosity of the polyesteramide compositions used is also shown. Results are shown below in Tables 12 to 26 below. Where Example numbers are shown, the Example is the same composition as previously used above.

Table 12 shows various interlayers comprising polyesteramide compositions having different diol and diamine levels. Some of the compositions also include a branching agent (TMP) in amount shown. In Table 12, six different formulations were tested. The polymer type is as follows: all had 100% DDA as the acid, and then the amount of CHDM is shown, the amount of diamine(s) is shown, and finally the amount (if any) of TMP is shown. The formulations used include: DDA 53(CHDM) 47(MACM) (100% DDA acid, 53% CHDM diol and 47% MACM diamine); DDA 53(CHDM) 47(MACM) xTMP (100% DDA acid, 53% CHDM diol and 47% MACM diamine and x % TMP (where x is the amount of TMP) as shown in the table); DDA 50(CHDM) 50(MACM) xTMP (100% DDA acid, 50% CHDM diol and 50% MACM diamine and x % TMP as shown in the table); DDA 45(CHDM) 55(MACM) 0.167TMP (100% DDA acid, 45% CHDM diol and 55% MACM diamine and 0.167% TMP); DDA 53(CHDM) 37(MACM) 10(PACM) 0.25TMP (100% DDA acid, 53% CHDM diol, 37% MACM diamine, 10% PACM diamine and 0.25% TMP); and DDA 53(CHDM) 37(MACM) 10(PACM) 0.25TMP (100% DDA acid, 53% CHDM diol, 42% MACM diamine, 5% PACM diamine and 0.25% TMP).

TABLE 12

| Ex # | Polymer Type | Break Height (ft.) |
|---|---|---|
|  | DDA 53(CHDM) 47(MACM) | >18 |
|  | DDA 53(CHDM) 47(MACM) 0.25(TMP) | >18 |
| 157 | DDA 50(CHDM) 50(MACM) 0.25(TMP) | >18 |
| 158 | DDA 50(CHDM) 50(MACM) 0.5(TMP) | >18 |
| 159 | DDA 45(CHDM)55(MACM) 0.167(TMP) | >18 |
|  | DDA 53(CHDM) 47(MACM) 0.67(TMP) | >18 |
| 167 | DDA 53(CHDM) 47(MACM) 0.25(TMP) | >18 |
|  | DDA 50(CHDM) 50(MACM) 0.5(TMP) | >18 |
|  | DDA 50(CHDM) 50(MACM) 0.3(TMP) | >18 |
|  | DDA 50(CHDM) 50(MACM) 0.3(TMP) | >18 |
|  | DDA 50(CHDM) 50(MACM) 0.1(TMP) | 17.9 |
|  | DDA 50(CHDM) 50(MACM) 0.5(TMP) | 17.9 |
|  | DDA 50(CHDM) 50(MACM) 0.3(TMP) | 17.3 |
|  | DDA 50(CHDM) 50(MACM) 0.3(TMP) | 16.6 |
|  | DDA 53(CHDM) 47(MACM) 0.25(TMP) | 16 |
|  | DDA 50(CHDM) 50(MACM) 0.3(TMP) | 16 |
|  | DDA 50(CHDM) 50(MACM) 0.1(TMP) | 16 |
|  | DDA 50(CHDM) 50(MACM) 0.5(TMP) | 15.6 |
|  | DDA 50(CHDM) 50(MACM) 0.1(TMP) | 15.6 |
|  | DDA 50(CHDM) 50(MACM) 0.3(TMP) | 15.3 |
|  | DDA 53(CHDM) 47(MACM) | 14.8 |
|  | DDA 53(CHDM) 47(MACM) 0.25(TMP) | 14.8 |
|  | DDA 50(CHDM) 50(MACM) 0.5(TMP) | 14.5 |
|  | DDA 50(CHDM) 50(MACM) 0.3(TMP) | 14.5 |
|  | DDA 50(CHDM) 50(MACM) 0.3(TMP) | 14.4 |
| 161 | DDA 53(CHDM) 47(MACM) 0.67(TMP) | 14.3 |
|  | DDA 50(CHDM) 50(MACM) 0.25(TMP) | 14.2 |
| 147 | DDA (CHDM)37 (MACM) 10(PACM) 0.25(TMP) | 14 |
|  | DDA 50(CHDM) 50(MACM) 0.1(TMP) | 13.8 |
|  | DDA 50(CHDM) 50(MACM) 0.1(TMP) | 13.8 |
| 146 | DDA 53(CHDM) 42(MACM) 5(PACM) 0.25(TMP) | 13.4 |
|  | DDA 53(CHDM) 47(MACM) | 13.3 |
|  | DDA 53(CHDM) 47(MACM) 1.5(TMP) | 13.2 |
|  | DDA 50(CHDM) 50(MACM) 0.1(TMP) | 12.5 |
|  | DDA 50(CHDM) 50(MACM) 0.1(TMP) | 12.1 |

The results in Table 12 show that interlayers comprising various polyesteramide compositions and having acceptable, and in many cases, excellent impact performance (as determined by break height) can be produced.

Table 13 shows various interlayers comprising polyesteramide compositions having different amounts of diamine and different acid types to test the impact (break height) of the different compositions used in interlayers. Some of the compositions also include a branching agent (TMP) in amount shown. The formulations use the same nomenclature as above for Table 12, except the amount of acid is also shown. For examples using only DDA as the acid, the amount of acid is 100%. For examples using other acids or a mix of acids, the amounts are as shown below. For example, Example #115 is 90(SE) 10(ODA) 57(CHDM) 43(MACM) 0.25(TMP) which is 90% SE (sebacic acid), 10% ODA acid, 57% CHDM diol, 43% MACM diamine and 0.25% TMP as branching agent.

TABLE 13

| Ex # | Polymer Type | Ih.V (dL/g) | DMTA Tg (° C.) | Break Height (ft.) |
|---|---|---|---|---|
| 126 | 100(DDA) 60(CHDM) 40(MACM) 0.25(TMP) | 1.034 | 52.3 | >18 |
|  | 100(DDA) 53(CHDM) 47(MACM) 0.25(TMP) | 1.071 | 65.7 | >18 |
| 115 | 90(SE) 10(ODA) 57(CHDM)43(MACM)0.25(TMP) | 1.101 | 66.6 | >18 |
|  | 100(DDA) 62.5(CHDM) 37.5(MACM) | — | 46.9 | 17.9 |
|  | 100(DDA) 60(CHDM) 40(MACM) 0.1(TMP) | 1.128 | 53.9 | 17.8 |
|  | 100(DDA) 60(CHDM)40(MACM) 1.0(TMP) | 1.098 | 52 | 17.6 |
| 89 | 100(SE) 63(CHDM) 37(MACM) | 0.991 | 52.9 | 17.6 |
| 88 | 100(SE) 65.2(CHDM) 34.8(MACM) | 0.919 | 48.4 | 17.5 |
|  | 100(DDA) 60(CHDM) 40(MACM) | 0.937 | 52.7 | 17.1 |
| 125 | 100(DDA) 60(CHDM) 40(MACM) 0.5(TMP) | 0.927 | 52.9 | 16.4 |
| 136 | 90(DDA) 10(ODA) 53(CHDM) 47(MACM) 0.25(TMP) | 1.042 | 65.4 | 16.1 |
| 142 | 95(DDA) 5(DA) 53(CHDM) 47(MACM) 0.25(TMP) | 1.058 | 66 | 16.1 |
|  | 95(DDA) 5(DA) 53(CHDM) 47(MACM) 0.25(TMP) | 1.096 | 64.8 | 13.9 |
|  | 100(SE) 55(CHDM) 45(MACM) 0.25(TMP) | 1.14 | 70.3 | 13.5 |
| 120 | 100(SE) 57(CHDM) 43(MACM) 0.25(TMP) | 1.203 | 67.3 | 13.2 |
| 140 | 90(DDA) 10(ODA) 53(CHDM) 47(MACM) 0.25(TMP) | 1.062 | 66.1 | 12.7 |
|  | 100(DDA) 55(CHDM) 25(MACM) 20(PACM) | 0.997 | 53.9 | 12.7 |
| 122 | 100(SE) 57(CHDM) 38(MACM) 5(PACM) 0.25(TMP) | 1.169 | 66.1 | 12.6 |
| 121 | 100(SE) 55(CHDM) 45(MACM) 0.25(TMP) | 1.133 | 70.6 | 12.4 |
| 114 | 100(DDA) 55(CHDM) 25(MACM) 20(PACM) 0.25(TMP) | 1.012 | 55.7 | 12.2 |
|  | 90(DDA) 10(ODA) 53(CHDM) 47(MACM) 0.25(TMP) | 1.059 | — | 12.1 |

Table 13 shows that interlayers made from different polyesteramide compositions where the acid is varied as well as the diol and diamine levels have a break height of at least 12 feet in many cases, and in some cases have excellent impact performance (as determined by break height).

Table 14 shows samples made with the same formulation with and without TMP branching agent to test the repeatability of the impact test and to determine the effect of TMP on the interlayer's impact strength. The formulations included 100% DDA as the acid, 53% CHDM as the diol, 47% MACM as the diamine and 0.25% TMP.

TABLE 14

| Polymer Type | Ih.V (dL/g) | % Haze | YI | Break Height (ft.) |
|---|---|---|---|---|
| DDA 53(CHDM) 47(MACM) | 1.123 | 0.71 | −0.18 | >18 |
| DDA 53(CHDM) 47(MACM) | 1.153 | 0.92 | −0.19 | >18 |
| DDA 53(CHDM) 47(MACM) | 1.084 | 0.28 | −0.23 | 13.3 |
| DDA 53(CHDM) 47(MACM) | 1.121 | 0.3 | −0.34 | >18 |
| DDA 53(CHDM) 47(MACM) | 1.137 | 0.93 | −0.28 | >18 |
| DDA 53(CHDM) 47(MACM) | 1.104 | 0.73 | −0.32 | >18 |
| DDA 53(CHDM) 47(MACM) | 1.082 | 1.17 | −0.35 | >18 |
| DDA 53(CHDM) 47(MACM) | 1.104 | 0.64 | −0.08 | >18 |
| DDA 53(CHDM) 47(MACM) | 1.104 | 0.51 | −0.19 | >18 |
| DDA 53(CHDM) 47(MACM) | 1.056 | 1.41 | 0.3 | >18 |
| DDA 53(CHDM) 47(MACM) | 1.13 | 0.5 | −0.22 | >18 |
| DDA 53(CHDM) 47(MACM) | 1.054 | 0.46 | −0.33 | 14.9 |
| DDA 53(CHDM) 47(MACM) | 1.069 | 0.31 | −0.17 | >18 |
| DDA 53(CHDM) 47(MACM) | 1.1 | 0.39 | −0.21 | >18 |
| DDA 53(CHDM) 47(MACM) | 1.069 | 0.52 | 0.06 | 13.8 |
| DDA 53(CHDM) 47(MACM) | 1.081 | 0.25 | −0.19 | >18 |
| DDA 53(CHDM) 47(MACM) | 1.098 | 4.39 | 0.08 | >18 |
| DDA 53(CHDM) 47(MACM) | 1.07 | 0.26 | −0.28 | >18 |
| DDA 53(CHDM) 47(MACM) | 0.963 | 0.26 | 0.42 | 9.4 |
| DDA 53(CHDM) 47(MACM) | 0.911 | 0.38 | 0.93 | 8.6 |
| DDA 53(CHDM) 47(MACM) 0.25(TMP) | 1.125 | 0.4 | 1.49 | >18 |
| DDA 53(CHDM) 47(MACM) 0.25(TMP) | 1.136 | 0.32 | 1.27 | >18 |
| DDA 53(CHDM) 47(MACM) 0.25(TMP) | 1.117 | 0.42 | 1.4 | >18 |
| DDA 53(CHDM) 47(MACM) 0.25(TMP) | 1.195 | 0.43 | 1.81 | >18 |
| DDA 53(CHDM) 47(MACM) 0.25(TMP) | 1.265 | 0.99 | −0.24 | >18 |
| DDA 53(CHDM) 47(MACM) 0.25(TMP) | 1.299 | 0.62 | 0 | >18 |
| DDA 53(CHDM) 47(MACM) 0.25(TMP) | 1.276 | 0.37 | −0.04 | >18 |
| DDA 53(CHDM) 47(MACM) 0.25(TMP) | 1.278 | 0.74 | 1.82 | >18 |
| DDA 53(CHDM) 47(MACM) 0.25(TMP) | 1.313 | 0.6 | −0.08 | >18 |
| DDA 53(CHDM) 47(MACM) 0.25(TMP) | 1.152 | 0.59 | 0.11 | >18 |
| DDA 53(CHDM) 47(MACM) 0.25(TMP) | 1.199 | 1.61 | 0.04 | >18 |
| DDA 53(CHDM) 47(MACM) 0.25(TMP) | 1.223 | 0.53 | 0.03 | >18 |

Table 14 shows that adding 0.25% TMP provides more consistent break height (all samples had greater than 18 feet). For the samples without TMP, most samples were at least 12 feet, and many were greater than 18 feet. The lower impact numbers for a few samples could be due to the sample variability as each sample was a different sample separately made as a reactor batch at lab scale. Also, the inherent viscosity of the samples with TMP is generally higher than that of the samples without TMP.

Table 14 also shows that interlayers having low haze, and in some cases, very low haze (less than 1%), can be produced from polyesteramide compositions. Table 14 further shows that interlayers having low YI and, in some cases, very low YI, can be produced from polyesteramide compositions.

Table 15 compares the Tg (by DMTA) and shear storage modulus (at three different temperatures) of interlayers formed from polyesteramides with different MACM levels as well as two comparative examples of commercially available poly(vinyl butyral) interlayers. The nomenclature for the polymers is as described above. All of the examples have 100% DDA as the acid, CHDM as the diol in the amounts shown, and MACM as the diamine in the amounts shown. Some formulations also include TMP as a branching agent.

TABLE 15

| Ex # | Polymer Type | DMTA Tg (° C.) | Shear Storage Modulus (MPa) (22° C.) | Shear Storage Modulus (MPa) (50° C.) | Shear Storage Modulus (MPa) (60° C.) |
|---|---|---|---|---|---|
|  | DDA 40(CHDM) 60(MACM) 0.25(TMP) | 92.5 | 330 | 280 | 245 |
|  | DDA 50(CHDM) 50(MACM) 0.30(TMP) | 73.4 | 270 | 125 | 52 |
| 132 | DDA 53(CHDM) 47(MACM) 0.25(TMP) | 65.7 | 202 | 57.9 | 14.3 |
|  | DDA 57.5(CHDM) 42.5(MACM) | 57.8 | 177 | 17.3 | 3.3 |
| 126 | DDA 60(CHDM) 40(MACM) 0.25(TMP) | 52.3 | 127 | 6.9 | 2 |
|  | DDA 62.5(CHDM) 37.5(MACM) | 46.9 | 70.9 | 4.1 | 2 |
| CE1 | RB41 PVB | 30 | 25 | 0.5 | 0.4 |
| CE2 | DG41 PVB | 43 | 300 | 1 | 0.6 |

As Table 15 shows, as the MACM level decreases, the Tg (by DMTA) and the shear storage modulus also decrease. The 50° C. and 60° C. shear storage modulus values of the polyesteramide interlayers in the examples of Table 15 are significantly higher than those of the comparative examples CE1 and CE2. Comparative Examples CE1 and CE2 are two poly(vinyl butyral) interlayers, RB41 Architectural interlayer and DG41 Structural interlayer (commercially available as Saflex® RB41 and DG41 interlayers from Eastman Chemical Company) which are used in various applications.

Table 16 compares the Tg (by DMTA) and shear storage modulus (at three different temperatures) of interlayers formed from polyesteramides with different MACM levels and SE as the acid. The nomenclature for the polymers is as described above. The examples have 100% SE as the acid, CHDM as the diol in the amounts shown, MACM as the diamine in the amounts shown, and 0.25% TMP.

TABLE 16

| Ex # | Polymer Type | DMTA Tg (° C.) | Shear Storage Modulus (MPa) (22° C.) | Shear Storage Modulus (MPa) (50° C.) | Shear Storage Modulus (MPa) (60° C.) |
|---|---|---|---|---|---|
|  | SE 55(CHDM) 45(MACM) 0.25(TMP) | 70.3 | 224 | 85.5 | 28 |
| 120 | SE 57(CHDM) 43(MACM) 0.25(TMP) | 67.3 | 256 | 78.9 | 20.6 |

Table 16 shows that at the lower diol level, the DMTA value is higher as are the shear storage modulus values at 50° C. and 60° C. The 50° C. and 60° C. shear storage modulus values of the polyesteramide interlayers in the examples of Table 16 are significantly higher than those of the poly(vinyl butyral interlayer), comparative examples CE1 and CE2 (in Table 15).

Table 17 compares the Tg (by DMTA) and shear storage modulus (at three different temperatures) of interlayers formed from polyesteramides with different levels of TMP. The nomenclature for the polymers is as described above. The examples have 100% DDA as the acid, 60% CHDM as the diol, 40% MACM as the diamine in the amounts shown, and from 0 to 0.50% TMP as shown in the table.

TABLE 17

| Ex # | Polymer Type | DMTA Tg (° C.) | Shear Storage Modulus (MPa) (22° C.) | Shear Storage Modulus (MPa) (50° C.) | Shear Storage Modulus (MPa) (60° C.) |
|---|---|---|---|---|---|
|  | DDA 60(CHDM) 40(MACM) | 52.7 | 132 | 7.8 | 2.3 |
| 126 | DDA 60(CHDM) 40(MACM) 0.25(TMP) | 52.3 | 127 | 6.9 | 2 |
| 125 | DDA 60(CHDM) 40(MACM) 0.5(TMP) | 52.9 | 128 | 7.5 | 2.2 |

Table 17 shows that for polyesteramides having the same levels of acid, diol and diamine (100% acid, 60% diol and 40% diamine), increasing only the amount of branching agent (TMP) has little effect on the Tg (by DMTA) and shear storage modulus of the polyesteramides.

Table 18 compares the DMTA and shear storage modulus for interlayers comprising polyesteramides made from acids of different chain length (DDA vs. SE) with the same amounts of CHDM and MACM. The nomenclature for the polymers is as described above.

TABLE 18

| Ex # | Polymer Type | DMTA Tg (° C.) | Shear Storage Modulus (MPa) (22° C.) | Shear Storage Modulus (MPa) (50° C.) | Shear Storage Modulus (MPa) (60° C.) |
|---|---|---|---|---|---|
|  | DDA 55(CHDM) 45(MACM) | 61.5 | ~210 | 31 | 5.5 |
| 121 | SE 55(CHDM) 45(MACM) 0.25(TMP) | 70.6 | 249 | 98.6 | 33.9 |

As shown in Table 18, decreasing the acid chain length from 12 to 10 carbon atoms increases Tg (by DMTA) and shear storage modulus. The shear modulus increase at 50° C. and 60° C. is significantly higher, which would benefit laminated glass applications where the interlayer may be required to bear load and/or have higher modulus.

Table 19 compares the DMTA and shear storage modulus for interlayers comprising polyesteramides made from SE and a combination of SE and ODA as the acid. The nomenclature for the polymers is as described above.

TABLE 19

| Ex # | Polymer Type | DMTA Tg (° C.) | Shear Storage Modulus (MPa) (22° C.) | Shear Storage Modulus (MPa) (50° C.) | Shear Storage Modulus (MPa) (60° C.) |
|---|---|---|---|---|---|
| 121 | 100(SE) 55(CHDM) 45(MACM) 0.25(TMP) | 70.6 | 249 | 98.6 | 33.9 |
| 117 | 90(SE) 10(ODA) 55(CHDM) 45(MACM) 0.25(TMP) | 66.9 | 222 | 64.8 | 16.7 |

As shown in Table 19, adding just 10% ODA (longer chain acid having 18 carbon atoms) in place of SE decreases the Tg (DMTA) and the shear storage modulus at all temperatures. It is hypothesized that the incorporation of ODA, a longer carbon chain acid than the SE, allows for more polymer chain mobility which depresses the Tg (by DMTA) and reduces the storage modulus of the polyesteramide.

Table 20 compares interlayers made with blends of two diamines, MACM and PACM, in varying amounts, at 53% CHDM level and with DDA as the acid. The nomenclature is as described above.

TABLE 20

| Polymer Type | Shear Storage Modulus (MPa) (22° C.) | Shear Storage Modulus (MPa) (80° C.) |
|---|---|---|
| DDA 53(CHDM) 47(MACM) 0(PACM) | 267 | 1.4 |
| DDA 53(CHDM) 42(MACM) 5(PACM) | 211 | 1.5 |
| DDA 53(CHDM) 37(MACM) 10(PACM) | 220 | 1.7 |
| DDA 53(CHDM) 17(MACM) 30(PACM) | 160 | 4.5 |

As shown in Table 20, as PACM level increases from 0 to 30%, 22° C. shear storage modulus decreases, however the 80° C. modulus increases significantly. High modulus at elevated temperature, such as 80° C., can be beneficial in various interlayer and laminated glass applications involving hot climates and/or exposure to intense sunlight.

Table 21 compares an interlayer made with a blend of two diamines, MACM and PACM, compared to an interlayer having only PACM, at 55% CHDM level with DDA as the acid. The nomenclature is as described above.

TABLE 21

| Polymer Type | DMTA Tg (° C.) | Shear Storage Modulus (MPa) (22° C.) | Shear Storage Modulus (MPa) (80° C.) |
|---|---|---|---|
| DDA 55(CHDM) 35(MAGM) 10(PACM) | 59.1 | 166 | 1.2 |
| DDA 55(CHDM) 25(MACM) 20(PACM) | 55.1 | 165 | 3 |
| DDA 55(CHDM) 0(MACM) 45(PACM) | 37.7 | 77 | 12.3 |

As shown in Table 21, there is a significant increase in the 80° C. modulus as the PACM level is increased from 10 to 45%. The 80° C. modulus increases with the level of PACM despite the fact that Tg (by DMTA) decreases as the PACM level increases.

Table 22 shows adhesion to glass data for several polyesteramides of varying compositions. All laminates were made with 3 mm glass (using the lamination procedure previously described). Adhesion to glass was tested using the pummel method at room temperature (21° C.).

TABLE 22

| Polymer Type | Air side adhesion (Pummel) | Tin side adhesion (Pummel) |
|---|---|---|
| 100(DDA) 53(CHDM) 47(MACM) 0.25(TMP) | 2 | 2 |
| 100(DDA) 53(CHDM) 47(MACM) 0.25(TMP) | not tested | 8 |
| 100(DDA) 60(CHDM) 20(MACM) 20(PACM) | 6 | not tested |
| 100(DDA) 60(CHDM) 40(MACM) | 5 | 5 |
| 100(DDA) 57.5(CHDM) 42.5(MACM) | 5 | 4 |
| 100(DDA) 30(CHDM) 30(TMCD) 20(MACM) 20(PACM) | 4 | 8 |
| 100(DDA) 55(CHDM) 45(MACM) | 4 | 7 |
| 100(DDA) 55(CHDM) 45(MACM) | 4 | 6 |
| 100(DDA) 40(CHDM) 20(TMCD) 20(PACM) 20(MACM) | 4 | 7 |
| 100(DDA) 20(CHDM) 40(TMCD) 20(PACM) 20(MACM) | 3 | 6 |
| 100(SE) 65.2(CHDM) 34.8(MACM) | 3 | 6 |
| 100(DDA) 55(CHDM) 40(MACM) 5(PACM) | 2 | 5 |
| 67(DDA) 33(AD) 61.5 (CHDM) 38.5(MACM) | 2 | 5 |
| 67(DDA) 33(AD) 60.5(CHDM) 39.5(MACM) | 2 | 4 |
| 67(DDA) 33(AD) 59.5 (CHDM) 40.5(MACM) | 2 | 5 |
| 50(DDA) 50(AD) 64(CHDM) 36(MACM) | 2 | 3 |
| 100(SE) 63(CHDM) 37(MACM) | 2 | 5 |

It can be seen from Table 22 that many polyesteramides have acceptable or good adhesion to glass, while others have excellent adhesion to glass. While there is some variability (which may be due to the different samples), it is clear that the polyesteramides of various compositions adhere to glass.

Table 23 shows how the adhesion to glass of a polyesteramide formulation significantly improved when 1 wt. % of GPTMS silane was added. The GPTMS silane was incorporated into the polyesteramide melt using a Brabender mixer at a temperature of 175° C. The resulting melt was then cooled and pressed into 30 mil (0.76 mm) sheet, laminated with 3 mm glass as described above and tested for pummel adhesion at room temperature (21° C.).

TABLE 23

| Polymer Type | GPTMS Additive (wt. %) | Air side adhesion (Pummel) | Tin side adhesion (Pummel) |
|---|---|---|---|
| DDA 53(CHDM) 47(MACM) 0.25(TMP) | 0 | 1 | 1 |
| DDA 53(CHDM) 47(MACM) 0.25(TMP) | 1 | 8 | 8 |

Table 23 shows that the addition of a small amount of the silane (GPTMS) as an adhesion promoter significantly increased adhesion to both the air and tin side of the glass.

Multilayer (tri-layer) interlayers were constructed using a polyesteramide material having low Tg (66° C.) as the skin or outer layers and a high Tg (about 150° C.) polyesteramide, commercially available polyester or plastic materials as the inner or core layer, or a plasticized cellulose ester (Eastman CAP with 16% 3GEH plasticizer) as the inner or core layer. The low Tg polyesteramide composition used was: 100(DDA) 53(CHDM) 47(MACM) 0.25(TMP), and the high Tg polyesteramide composition used was: 60(DDA) 40(1,3-CHDA) 20(TMCD) 80(MACM). The interlayers were laminated in the same manner as previously described to form a glass laminate. After lamination, the laminates were tested for color (YI), % Haze, compressive shear and break height. Data is shown in Table 24 below.

TABLE 24

| Core Layer | YI | % Haze | Compressive Shear (MPa) | Break Height (ft.) |
|---|---|---|---|---|
| Cellullose Ester | — | — | 9.7 | — |
| High Tg Polyesteramide | 3.3 | 1.5 | >28 | — |
| Tritan ™ copolyester | 1.9 | 1.9 | >28 | 22.5 |
| Spectar ™ copolyester | 1.9 | 1 | >28 | 22.5 |
| Treva ™ engineering bioplastic | 1.9 | 1.9 | 19.1 | 22.2 |

As shown by the data in Table 24, polyesteramides disclosed herein can be used as the skin or outer layers in a multilayer interlayer to provide an interlayer having excellent haze, good color and/or good impact properties.

Additional multiple layer interlayers were produced using polyesteramide layers as the outer or skin layers and polycarbonate sheets as the inner or core layer. The polycarbonate sheets were 30 mil thickness commercially available sheets (RowTec polycarbonate film from Rowland Technologies). The polyesteramide skin layers were each 30 mil thick having different MACM and CHDM ratios. All polyesteramide formulations had 100% DDA as the diacid. Using the nomenclature previously described: PEA1 is DDA 72(CHDM) 28(MACM); PEA2 is DDA 75(CHDM) 25(MACM); PEA3 is DDA 80(CHDM) 20(MACM); and PEA4 is: DDA 57.5(CHDM) 42.5(MACM).

TABLE 25

| Material | PEA MACM level (%) | Compressive Shear Adhesion (MPa) |
|---|---|---|
| PEA4/PC30/PEA4 | 42.5 | 29.6 |
| PEA1/PC30/PEA1 | 28 | 12.6 |
| PEA2/PC30/PEA2 | 25 | 9.4 |
| PEA3/PC30/PEA3 | 20 | 5.2 |

Table 25 shows that multilayer interlayers having a polycarbonate core and polyesteramide skins or outer layers can be produced having good and, in some cases, excellent adhesion to glass. The use of the polyesteramide layers as the outer or skin layers allows the polycarbonate to be laminated between glass.

Multilayer (tri-layer) interlayers were constructed using a plasticized PVB material (RA41 or DG41 PVB interlayers commercially available from Eastman Chemical Company) as the skin or outer layers and a high Tg (about 150° C.) polyesteramide (60(DDA) 40(1,3-CHDA) 20(TMCD) 80(MACM)) as the inner or core layer. The interlayers were laminated in the same manner as previously described to form a glass laminate. After lamination, the laminates were tested for % Haze and compressive shear. Data is shown in Table 26 below.

TABLE 26

| Interlayer Construction | % Haze | Compressive Shear (MPa) |
|---|---|---|
| RA41/PEA/RA41 | 2.2 | 5.0 |
| DG41/PEA/DG41 | 1.9 | 15.7 |

As shown by the data in Table 26, polyesteramides disclosed herein can be used as the core layer in a multilayer interlayer to provide an interlayer having excellent haze, and good adhesion.

It is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

What is claimed is:

1. An interlayer comprising a layer comprising a polyesteramide composition, the polyesteramide composition comprising:
   (a) a diamine component comprising:
      10 to 90 mole % of diamine residues derived from cycloaliphatic diamines, aliphatic diamines, or a combination thereof;
   (b) a diol component comprising:
      10 to 80 mole % of diol residues derived from at least one diol which is a cycloaliphatic diol, a mixture of cycloaliphatic diols, or a mixture of at least one cycloaliphatic diol with at least one aliphatic diol; and
   (c) a diacid component comprising:
      0.1 to 100 mole % of diacid residues derived from a diacid selected from $HO_2C-(C_{2-40})$alkylene-$CO_2H$, or $HO_2C-(C_{3-10})$cycloalkyl-$CO_2H$, or a mixture of thereof;
   wherein each cycloalkyl is unsubstituted or substituted by $(C_{1-3})$alkyl,
   wherein the total mole % of the diacid component is 100 mole %, and wherein the total mole % of the combined diol and diamine component is 100 mole %.

2. The interlayer of claim 1, wherein the interlayer has a haze of less than 3.0% (as measured in accordance with ASTM D1003-61 (reapproved 1977)—Procedure B using Illuminant C, at an observer angle of 2 degrees on an interlayer having a thickness of 0.76 millimeters).

3. The interlayer of claim 1, wherein the diamine is present in an amount of from 20 to 75 mole %, and wherein the diamine is selected from 4,4'-methylenebis(2-methylcyclohexylamine), 4,4'-methylenebis(cyclohexylamine), 3(4),8(9)-bis(aminomethyl)tricyclo[5.2.1.0$^{2,6}$]decane, N-Methyl diethanolamine, a mixture of 2,4,4-trimethyl hexanediamine and 2,2,4-trimethyl hexanediamine, 1,3-bis(aminomethyl) cyclohexane, or a mixture of thereof.

4. The interlayer of claim 1, wherein the diol is selected from 2,2,4,4-tetramethylcyclobutane-1,3-diol, 1,3-cyclohexanedimethanol, 1,4-cyclohexanedimethanol, 1,4-butanediol, 1,6-hexanediol, or polytetrahydrofuran diol.

5. The interlayer of claim 1, wherein the diacid is selected from succinic acid, glutaric acid, adipic acid, heptanedioic acid, octanedioic acid, nonanedioic acid, decanedioic acid, undecanedioic acid, dodecanedioic acid, tridecanedioic acid, hexadecanedioic acid, octadecanedioic acid, eicosanedioic acid, 9-[(Z)-non-3-enyl]-10-octylnonadecanedioic acid, 9-nonyl-10-octylnonadecanedioic acid, cyclobutane-1,3-dicarboxylic acid, cyclopentane-1,3-dicarboxylic acid, cyclohexane-1,4-dicarboxylic acid, cyclohexane-1,3-dicarboxylic acid, cycloheptane-1,4-dicarboxylic acid, cyclooctane-1,5-dicarboxylic acid, or cyclooctane-1,4-dicarboxylic acid, or a combination of two or more diacids thereof.

6. The interlayer of claim 1, wherein the polyesteramide further comprises a branching agent derived from a compound selected from trimellitic acid, trimethylolpropane, trimethylolethane, glycerol, pentaerythritol, citric acid, tartaric acid, 3-hydroxyglutaric acid, glycerin, erythritol, threitol, dipentaerythritol, sorbitol, trimellitic anhydride, pyromellitic dianhydride, trimesic acid or dimethylol propionic acid, or a mixture of thereof, and wherein the branching agent is present from about 0.01 to about 10 weight % based on the total weight % of the polyesteramide.

7. The interlayer of claim 1, wherein the polyesteramide has an inherent viscosity of at least about 0.7 dL/g as determined according to ASTM D2857-70.

8. The interlayer of claim 1, wherein the interlayer has a glass transition temperature of at least –35° C. as determined according to DMTA.

9. The interlayer of claim 1, wherein when said interlayer is laminated between two sheets of glass each having a thickness of 3 mm to form a laminate, the laminate has a mean break height, measured according to ANSI/SAE Z26.1-1996 at a temperature of 70° F. and an interlayer thickness of 30 mils, of at least 12 feet.

10. The interlayer of claim 1, wherein the interlayer has a shear storage modulus of at least 10 MPa, measured according to ASTM D4065-12 at 50° C.

11. The interlayer of claim 1, wherein the interlayer has a shear storage modulus of at least 2 MPa, measured according to ASTM D4065-12 at 80° C.

12. A multilayer panel comprising a first substrate, the interlayer of claim 1, and a second substrate, wherein the interlayer is between the first and second substrates.

13. An interlayer comprising a layer comprising a polyesteramide composition, the polyesteramide composition comprising:
   (a) a diamine component comprising:
      10 to 90 mole % of diamine residues derived from 4,4' methylenebis(2-methylcyclohexylamine), 4,4'-methylenebis(cyclohexylamine), 3(4),8(9)-bis(aminomethyl)tricyclo[5.2.1.0$^{2,6}$]decane, N-Methyl diethanolamine, a mixture of 2,4,4-trimethyl hexanediamine and 2,2,4-trimethyl hexanediamine, 1,3-bis(aminomethyl)cyclohexane, or a mixture of thereof;

(b) a diol component comprising:
- 10 to 90 mole % of diol residues derived from at least one diol selected from 2,2,4,4-tetramethylcyclobutane-1,3-diol, 1,3-cyclohexanedimethanol, 1,4-cyclohexanedimethanol, 1,4-butanediol, 1,6-hexanediol, or polytetrahydrofuran diol, or a mixture of thereof; and (c) a diacid component comprising:
- 0.1 to 100 mole % of diacid residues derived from a diacid selected from $HO_2C-(C_{2-40})$alkylene-$CO_2H$, or $HO_2C-(C_{3-10})$cycloalkyl-$CO_2H$, or a mixture of thereof;
- wherein each cycloalkyl is unsubstituted or substituted by $(C_{1-3})$alkyl,
- wherein the total mole % of the diacid component is 100 mole %, and wherein the total mole % of the combined diol and diamine component is 100 mole %,
  - wherein the polyesteramide has an inherent viscosity of at least about 0.7 dL/g as determined according to ASTM D2857-70, and
  - wherein the interlayer has a shear storage modulus of at least 10 MPa, measured according to ASTM D4065-12 at 50° C.

14. The interlayer of claim 13, wherein the diamine is present in an amount of from 20 to 75 mole %.

15. The interlayer of claim 13, wherein the polyesteramide further comprises a branching agent derived from a compound selected from trimellitic acid, trimethylolpropane, trimethylolethane, glycerol, pentaerythritol, citric acid, tartaric acid, 3-hydroxyglutaric acid, glycerin, erythritol, threitol, dipentaerythritol, sorbitol, trimellitic anhydride, pyromellitic dianhydride, trimesic acid, dimethylol propionic acid, or a mixture of thereof, and wherein the branching agent is present from about 0.01 to about 10 weight % based on the total weight % of the polyesteramide.

16. The interlayer of claim 13, wherein the interlayer has a shear storage modulus of at least 2 MPa, measured according to ASTM D4065-12 at 80° C.

17. The interlayer of claim 13, wherein when said interlayer is laminated between two sheets of glass each having a thickness of 3 mm to form a laminate, the laminate has a mean break height, measured according to ANSI/SAE Z26.1-1996 at a temperature of 70° F. and an interlayer thickness of 30 mils, of at least 12 feet.

18. A multilayer panel comprising a first substrate, the interlayer of claim 13, and a second substrate, wherein the interlayer is between the first and second substrates.

19. An interlayer comprising a layer comprising a polyesteramide composition, the polyesteramide composition comprising:

(a) a diamine component comprising:
- 10 to 90 mole % of diamine residues derived from 4,4' methylenebis(2-methylcyclohexylamine), 4,4'-methylenebis(cyclohexylamine), 3(4),8(9)-bis(aminomethyl)tricyclo[5.2.1.0$^{2,6}$]decane, N-Methyl diethanolamine, a mixture of 2,4,4-trimethyl hexanediamine and 2,2,4-trimethyl hexanediamine, 1,3-bis(aminomethyl)cyclohexane, or a mixture of thereof;

(b) a diol component comprising:
- 10 to 80 mole % of diol residues derived from at least one diol selected from 2,2,4,4-tetramethylcyclobutane-1,3-diol, 1,3-cyclohexanedimethanol, 1,4-cyclohexanedimethanol, 1,4-butanediol, 1,6-hexanediol, polytetrahydrofuran diol, or a mixture of thereof; and (c) a diacid component comprising:
- 0.1 to 100 mole % of diacid residues derived from a diacid selected from $HO_2C-(C_{2-40})$alkylene-$CO_2H$, or $HO_2C-(C_{3-10})$cycloalkyl-$CO_2H$, or a mixture of thereof;

wherein each cycloalkyl is unsubstituted or substituted by $(C_{1-3})$alkyl, wherein the total mole % of the diacid component is 100 mole %, and wherein the total mole % of the combined diol and diamine component is 100 mole %,
- wherein the polyesteramide comprises a branching agent derived from a compound selected from trimellitic acid, trimethylolpropane, trimethylolethane, glycerol, pentaerythritol, citric acid, tartaric acid, 3-hydroxyglutaric acid, glycerin, erythritol, threitol, dipentaerythritol, sorbitol, trimellitic anhydride, pyromellitic dianhydride, trimesic acid, dimethylol propionic acid, or a mixture of thereof, and wherein the branching agent is present from about 0.01 to about 10 weight % based on the total weight % of the polyesteramide,
- wherein the polyesteramide has an inherent viscosity of at least about 0.7 dL/g as determined according to ASTM D2857-70,
- wherein the interlayer has a shear storage modulus of at least 10 MPa, measured according to ASTM D4065-12 at 50° C., and
- wherein the interlayer has a haze of less than 3.0% (as measured in accordance with ASTM D1003-61 (reapproved 1977)—Procedure B using Illuminant C, at an observer angle of 2 degrees on an interlayer having a thickness of 0.76 millimeters).

20. The interlayer of claim 19, wherein the diamine is present in an amount of from 40 to 60 mole %, and wherein the diamine component comprises at least two diamines, or the diol component comprises at least two diols, or the diacid comprises at least two diacids, or the diamine component comprises at least two diamines, the diol component comprises at least two diols and the diacid comprises at least two diacids.

* * * * *